US012602843B2

(12) United States Patent
Wang et al.

(10) Patent No.: US 12,602,843 B2
(45) Date of Patent: Apr. 14, 2026

(54) METHOD FOR CONVERTING ENDOSCOPE IMAGES TO NARROW BAND IMAGES

(71) Applicant: National Chung Cheng University, Chiayi County (TW)

(72) Inventors: Hsiang-Chen Wang, Chiayi City (TW); Yu-Ming Tsao, Chiayi County (TW); Arvind Mukundan, Chiayi County (TW)

(73) Assignee: NATIONAL CHUNG CHENG UNIVERSITY, Chiayi County (TW)

( * ) Notice: Subject to any disclaimer, the term of this patent is extended or adjusted under 35 U.S.C. 154(b) by 287 days.

(21) Appl. No.: 18/590,995

(22) Filed: Feb. 29, 2024

(65) Prior Publication Data

US 2025/0173921 A1 May 29, 2025

(30) Foreign Application Priority Data

Nov. 29, 2023 (TW) ................................. 112146258

(51) Int. Cl.
*G06T 11/10* (2026.01)
*G06T 7/00* (2017.01)
*G06T 7/90* (2017.01)

(52) U.S. Cl.
CPC ............ *G06T 11/10* (2026.01); *G06T 7/0014* (2013.01); *G06T 7/90* (2017.01); *G06T 2207/10024* (2013.01); *G06T 2207/10068* (2013.01); *G06T 2207/30004* (2013.01); *G06T 2210/32* (2013.01)

(58) Field of Classification Search
CPC ...................................................... G06T 11/10
See application file for complete search history.

(56) References Cited

U.S. PATENT DOCUMENTS

| | | | | |
|---|---|---|---|---|
| 10,521,893 B2 * | 12/2019 | Shiga | ......................... | G06T 5/90 |
| 11,810,300 B2 * | 11/2023 | Wang | .................... | G06T 7/0014 |
| 2010/0141747 A1 * | 6/2010 | Kubo | ..................... | A61B 1/063 |
| | | | | 348/E7.085 |
| 2021/0381893 A1 * | 12/2021 | Balas | ..................... | G01N 33/02 |
| 2022/0383533 A1 * | 12/2022 | Takenouchi | ....... | A61B 1/00055 |
| 2023/0281818 A1 * | 9/2023 | Wang | ................... | G06V 10/255 |
| | | | | 382/133 |
| 2025/0029252 A1 * | 1/2025 | Wang | .................... | G06T 7/0012 |

* cited by examiner

*Primary Examiner* — Mark R Milia
(74) *Attorney, Agent, or Firm* — WPAT, PC

(57) ABSTRACT

The present application discloses a method for converting endoscope images to narrow band images. Firstly, obtaining a reference image data and a narrow band reference image data of a reference object, for obtaining a hyperspectral reference image data, a narrow band conversion parameter and a first light source parameter by operation and then correspondingly obtaining a simulated narrow band image data, which is further compared with the narrow band reference image data to obtain a chromatic aberration data. A second light source parameter is obtained according to the first light source parameter and the chromatic aberration data. An input image data of an endoscope is converted to a narrow band input image data according to the narrow band conversion parameter and the second light source parameter. Thus, the image identification ability and the definition of the input image are improved.

9 Claims, 19 Drawing Sheets

1

1

<u>1</u>

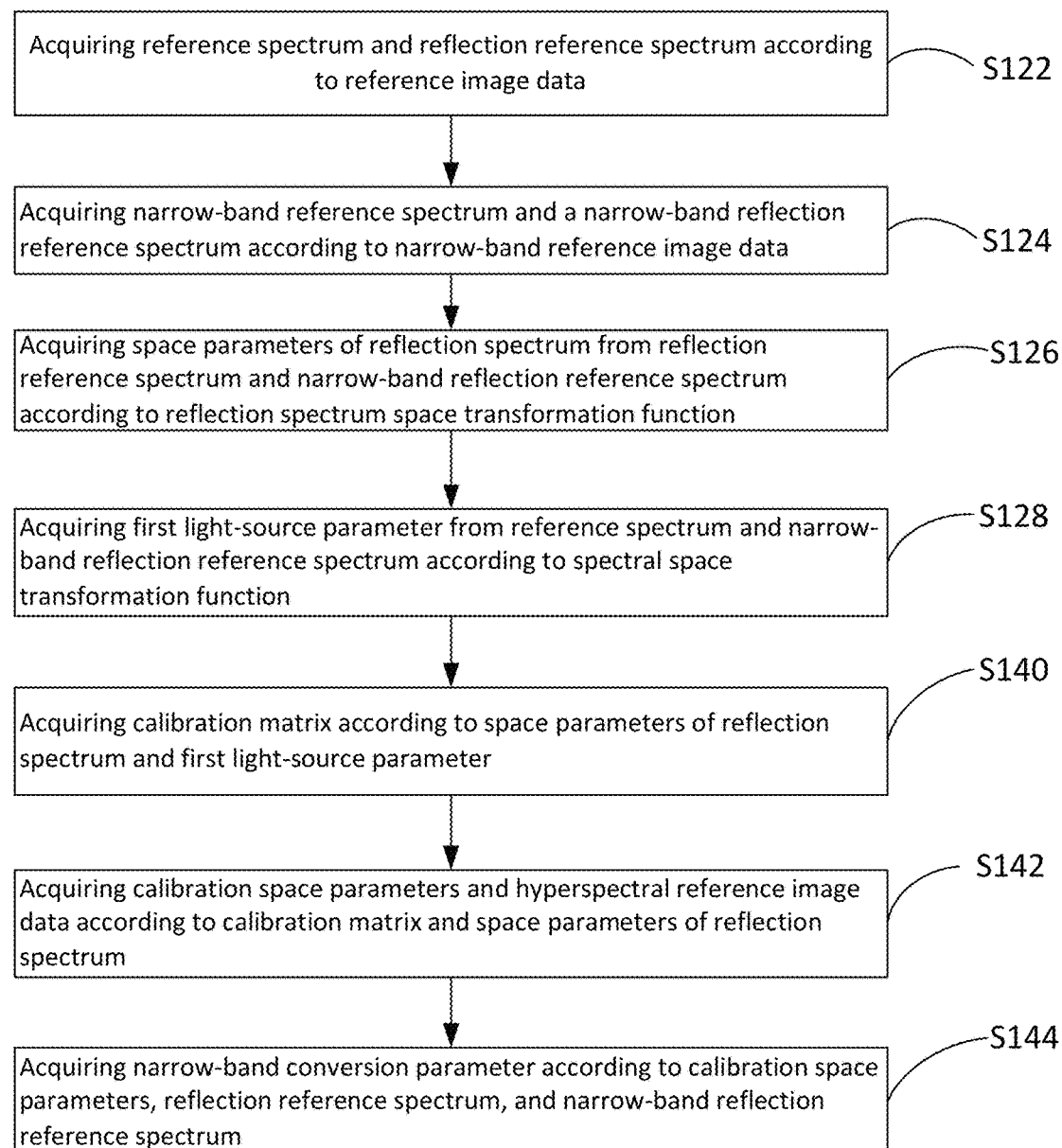

Acquiring reference spectrum and reflection reference spectrum according to reference image data — S122

Acquiring narrow-band reference spectrum and a narrow-band reflection reference spectrum according to narrow-band reference image data — S124

Acquiring space parameters of reflection spectrum from reflection reference spectrum and narrow-band reflection reference spectrum according to reflection spectrum space transformation function — S126

Acquiring first light-source parameter from reference spectrum and narrow-band reflection reference spectrum according to spectral space transformation function — S128

Acquiring calibration matrix according to space parameters of reflection spectrum and first light-source parameter — S140

Acquiring calibration space parameters and hyperspectral reference image data according to calibration matrix and space parameters of reflection spectrum — S142

Acquiring narrow-band conversion parameter according to calibration space parameters, reflection reference spectrum, and narrow-band reflection reference spectrum — S144

METHOD FOR CONVERTING ENDOSCOPE IMAGES TO NARROW BAND IMAGES

FIELD OF THE INVENTION

The present application is related to a method for processing images, in particular to a method for converting endoscope images to narrow band images.

BACKGROUND OF THE INVENTION

Current disease diagnosis technology usually relies on single macroscopic data and information, such as body temperature, blood pressure, and body scan images. For example, most of the commonly used instruments used to detect serious diseases, such as cancer, are based on imaging techniques, including X-ray, CT scan and nuclear magnetic resonance (NMR) imaging techniques. When these diagnostic instruments are used in combination, they are useful to varying degrees in diagnosing disease. However, when used alone, these instruments cannot provide accurate, reliable, efficient, and economical detection of major diseases in the early stages. Additionally, many of these existing instruments are huge and invasive, such as X-rays, CT scans, or nuclear magnetic resonance (NMR) imaging techniques. Endoscopy was developed to observe the lesions in the digestive organs or digestive tract to check whether there are lesions on the digestive organs.

Endoscopes generally refer to medical instruments that enter the human body using various channels to observe the internal conditions of the human body. Because endoscopes can extend into cavities that cannot be directly observed with the naked eye to capture images, endoscopes have become widely used. Its application in the medical field has a huge impact. Some endoscopes also have the function of surgical treatment, such as cystoscopy, gastroscopy, colonoscopy, bronchoscopy, laparoscopy, arthroscopy, etc. In other words, in addition to the image capture function, it can further provide corresponding surgical functions. For example: the esophagus is a tubular organ that connects the pharynx and the stomach. It is mainly responsible for transporting food swallowed from the mouth to the stomach. The normal esophageal mucosa has multiple layers of squamous epithelial cells with a thickness of about 200 to 500 μm. From the surface downward. The esophageal mucosa can be divided into the following layers including mucosal epithelium (EP), lamina propria mucosa (LPM), mucosal muscularis (MM), submucosa (SM), and muscularis propria (MP). Observation of the esophagus is the endoscopic examination using a gastroscope. Endoscopy is used to treat lesions on the esophagus. In addition to gastroscopy, the relatively new endoscopic technique also uses capsule endoscopy images for endoscopic examination.

Moreover, early esophageal lesions are not easy to be diagnosed. In addition to almost no symptoms in the early stage, some early esophageal cancers will not be visible even with esophageal endoscopy because the changes in these lesions are very subtle. There is often only a slight color change. Consequently, if traditional endoscopy is used for detection, a large number of early-stage esophageal cancer lesions will be ignored and treatments will be delayed. Therefore, the Lugol chromoendoscopy, narrow band Imaging (NBI), and magnifying endoscopy have been developed for lesions that are difficult to be detected.

However, the problem faced by every endoscopic detection is image identification. Even though narrow-band imaging technique is currently used to enhance the image identification of endoscopic detection, there are still deficiencies in chromatic aberration and brightness identification.

To solve the above problems, the present application provides a method for converting endoscope images to narrow band images, which comprises steps of: acquiring reference image data and narrow-band reference image data using an operational device; converting the reference image data into narrow-band simulated image data; after comparing the narrow-band reference image data and acquiring chromatic aberration data, the corresponding first light-source parameter of the narrow-band simulated image data and the chromatic aberration data are operated to obtain second light-source parameter; using the corresponding narrow-band conversion parameter of the narrow-band simulated image data and the second light-source parameter to convert the input image data of the endoscope into a narrow band image. Thereby, the image identification and the clarity of the input image can be enhanced.

SUMMARY OF THE INVENTION

An objective of the present application is to provide a method for converting endoscope images to narrow band images, which firstly acquiring reference image data and narrow-band reference image data of a reference object using an operational device, then acquiring narrow-band simulated image data by acquiring a corresponding hyperspectral reference image data, a narrow-band conversion parameter, and a first light-source parameter using the operational device, afterward acquiring a chromatic aberration data by comparing the narrow-band simulated data with the narrow-band reference image data, next acquiring second light-source parameter by executing operation of the chromatic aberration data and the first light-source parameter, and said operational device converting a input image data of an endoscope into a narrow-band image data. Thereby, the image identification and the clarity of the input image can be enhanced.

To achieve the above objective, the present application discloses a method for converting endoscope images to narrow band images. First, acquire reference image data of a reference object using an endoscope and acquire a narrow-band image data of the reference object using a narrow-band endoscope. An operational device receives the reference image data and the narrow-band reference image data from the endoscope and the narrow-band endoscope. Then the operational device executes data operations to obtain corresponding hyperspectral reference image data, a narrow-band conversion parameter and a first light-source parameter. Furthermore, generate narrow-band simulated image data according to the hyperspectral reference image data, the narrow-band conversion parameter and the first light-source parameter. Compare narrow-band simulated image data with the narrow-band reference image data initially acquired to obtain the corresponding chromatic aberration data. The operational device continues to execute data operations according to the chromatic aberration data and the second light-source parameter to obtain a second light-source parameter. In other words, the chromatic aberration between the narrow-band simulated image data and the narrow-band reference image data is obtained using the operational device for adjusting the first light-source parameter and thereby obtaining the second light-source parameter that are preferred and more matching the narrow-band reference image data. After acquiring the second light-source parameter, the operational device acquires input image data of an object under detect using the endoscope. The operational device receives the input image data, and then executes data operations on the input image data according to the narrow-band conversion parameter and the second light-source parameter to obtain a narrow band image of the object under detect. Thereby, the image identification and the clarity of the input image can be enhanced.

According to an embodiment of the present application, in the step of converting the reference image data into hyperspectral reference image data using the operational device, the operational device converts the reference image data into the hyperspectral reference image data of the reference object according to hyperspectral conversion parameters.

According to an embodiment of the present application, in the step of generating narrow-band simulated image data using the operational device according to the hyperspectral reference image data, the narrow-band conversion parameter and the one or more first target band parameter of the first light-source parameter, the operational device executes a tristimulus value equation to execute data operations on the hyperspectral reference image data, the image conversion model, and the one or more first target band for generating the narrow-band simulated image data of the reference object.

According to an embodiment of the present application, in the step of generating narrow-band image data of the object under detect according to the input image data, the narrow-band conversion parameter, and the corresponding one or more second target band parameter of the second light-source parameter using the operational device, the operational device executes a tricolor stimulus equation to execute data operations on the input image data, the narrow-band conversion parameter, and the one or more second target band parameter to generate the narrow-band image data of the object under detect.

According to an embodiment of the present application, the one or more second target band parameter is selected from the group consisting of wavelengths 575 nanometers to 588 nanometers, wavelengths 640 nanometers to 666 nanometers, and wavelengths 705 nanometers to 744 nanometers.

According to an embodiment of the present application, in the step of acquiring second light-source parameter by executing data operations according to the chromatic aberration data and the first light-source parameter using the operational device, the operational device executes a dual simulated annealing algorithm and acquires the second light-source parameter according to the chromatic aberration data and the first light-source parameter.

According to an embodiment of the present application, in the step of acquiring hyperspectral reference image data, a narrow-band conversion parameter, and a first light-source parameter using the operational device according to the reference image data and the narrow-band reference image data, the operational device first acquires a reference spectrum and a reflection reference spectrum according to the reference image data. Next, the operational device acquires a narrow-band reference spectrum and a narrow-band reflection reference spectrum according to the narrow-band reference image data. Then, the operational device acquires spectral reflectance space parameter from the reflection reference spectrum and the narrow-band reflection reference spectrum according to a reflection spectrum space transformation function, and acquires the first light-source parameter from the reference spectrum and the narrow-band reflection reference spectrum according to a spectral space transformation function. Afterwards, the operational device acquires a calibration matrix according to the spectral reflectance space parameter and the first light-source parameter.

Then the operational device acquires calibration space parameters and the hyperspectral reference image data according to the calibration matrix and the spectral reflectance space parameter, and acquires the narrow-band conversion parameter according to the calibration space parameters, the reflection reference spectrum, and the narrow-band reflection reference spectrum.

According to an embodiment of the present application, in the step of acquiring a reference spectrum and a reflection reference spectrum according to a reference image data, the operational device acquires the RGB image of each color of the reference object to analyze and acquire the corresponding reference spectrum and reflection reference spectrum.

According to an embodiment of the present application, in the step of acquiring the chromatic aberration data by comparing the narrow-band reference image data and the narrow-band simulated image data using the operational device, the operational device operates first root-mean-square error data and second root-mean-square error of the narrow-band reference image data and the narrow-band simulated image data. The operational device compares the first root-mean-square error data and the second root-mean-square error to obtain the chromatic aberration data.

BRIEF DESCRIPTION OF DRAWINGS

FIG. 3 shows a flowchart of operating the narrow-band conversion parameter and the first light-source parameter according to the first embodiment of the present application;

DETAILED DESCRIPTION OF THE INVENTION

In order to make the structure and characteristics as well as the effectiveness of the present application to be further understood and recognized, the detailed description of the present application is provided as follows along with embodiments and accompanying figures.

In view of the huge operation amount caused by the input image data of the endoscopes according to the prior art, the present application provides a method for converting endoscope images to narrow band images to solve the problems of huge operation amount and identification difficulty encountered by the endoscope technique according to the prior art.

In the following, the characteristics and the accompanying system for the method for converting endoscope images to narrow band images disclosed by the present application will be further illustrated.

Figure 1:
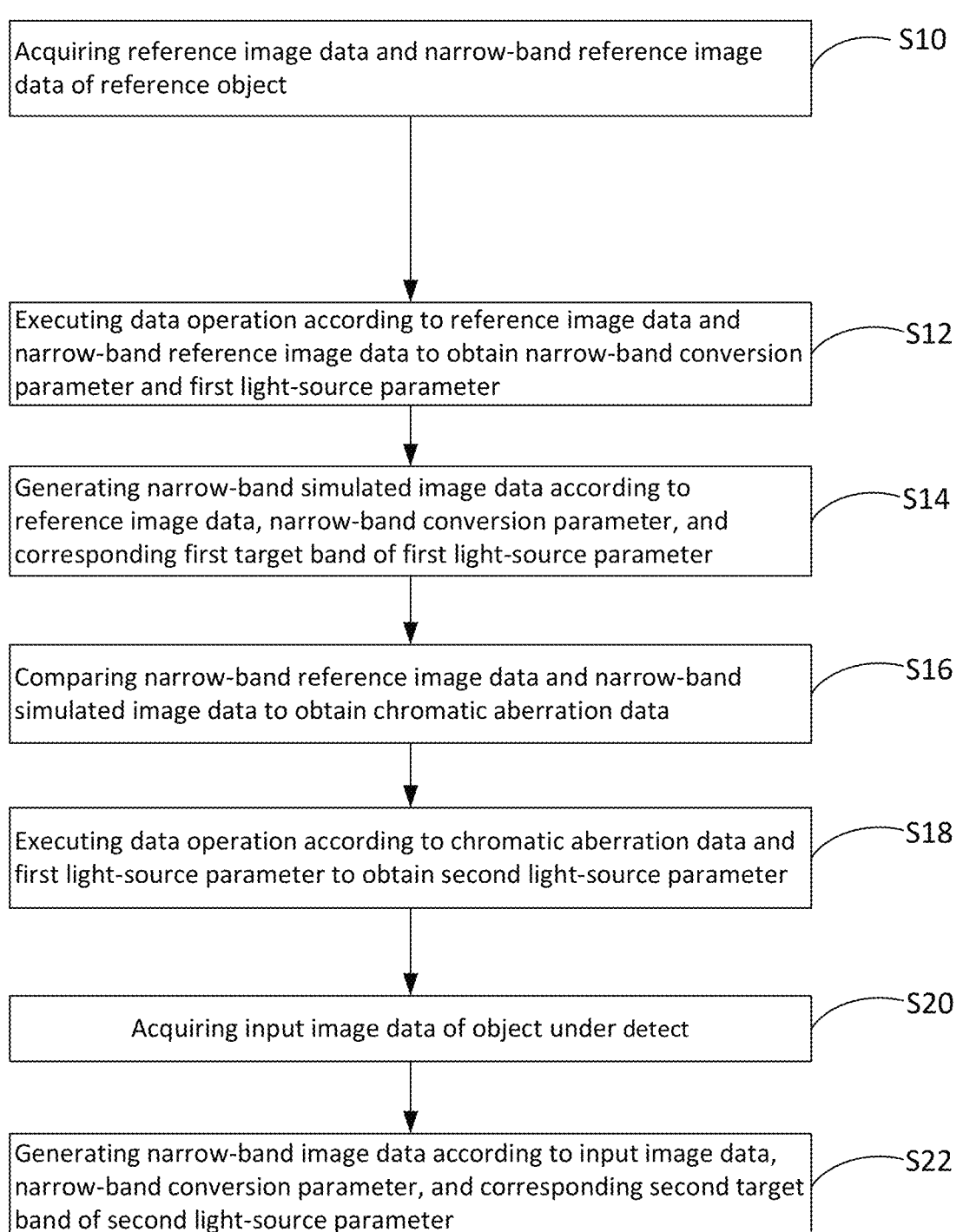
FIG. 1 shows a flowchart according to the first embodiment of the present application.

First, please refer to FIG. 1, which shows a flowchart according to the first embodiment of the present application. As shown in the figure, the method for converting endoscope images to narrow band images according to the present application comprises steps of:

Step S10: Acquiring reference image data and narrow-band reference image data of reference object;

Step S12: Executing data operation according to reference image data and narrow-band reference image data to obtain narrow-band conversion parameter and first light-source parameter;

Step S14: Generating narrow-band simulated image data according to reference image data, narrow-band conversion parameter, and corresponding first target band of first light-source parameter;

Step S16: Comparing narrow-band reference image data and narrow-band simulated image data to obtain chromatic aberration data;

Step S18: Executing data operation according to chromatic aberration data and first light-source parameter to obtain second light-source parameter;

Step S20: Acquiring input image data of object under detect; and

Step S22: Generating narrow-band image data according to input image data, narrow-band conversion parameter, and corresponding second target band of second light-source parameter.

Please refer to FIG. 2A to FIG. 2F. The accompanying inspection system 1 of the method for converting endoscope images to narrow band images comprises an operational device 10, an endoscope 20, and a narrow-band endoscope 22. The operation device 10 according to the present embodiment is, for example, a desktop computer, which includes a processing unit 12, a memory 14, and a storage unit 16. Nonetheless, the present application is not limited to the embodiment. The operational device 10 can further be a server, a notebook computer, a tablet computer, or an electronic device with logic operation capability. A database 30 can be built in, but not limited to, the storage unit. The storage unit 16 can further be an external storage unit of the operational device 10, meaning that the database 30 can be disposed outside the operational device 10. The operational device 10 uses the processing unit 12 to execute image processing and thus applying the techniques in the present application. In addition, the endoscope 20 and the narrow-band endoscope 22 according to the present embodiment are applied for probing internal organs and tissues, such as a cystoscope, a gastroscope, a colonoscope, a bronchoscope, and a laparoscope.

Figure 2A:
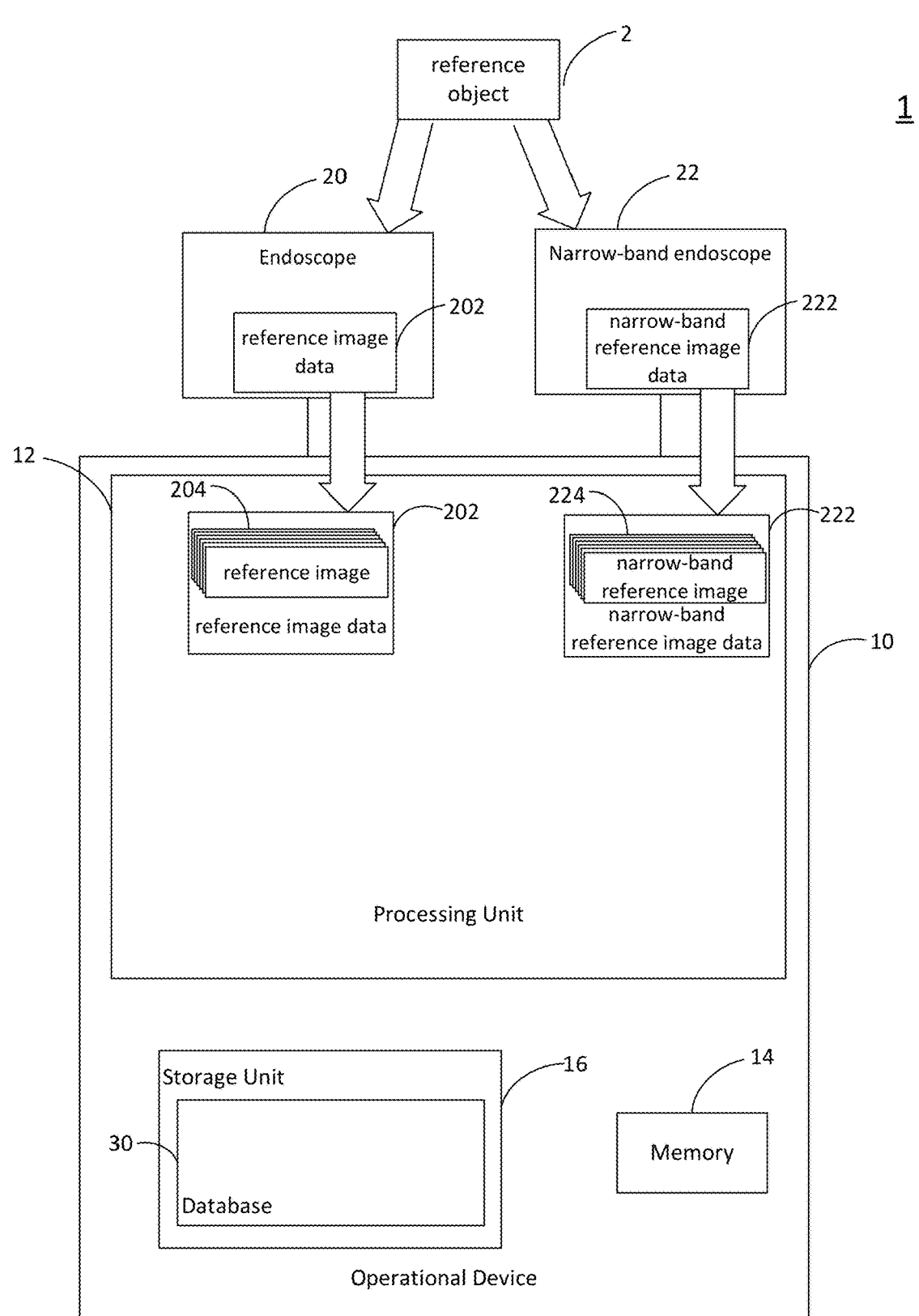
FIG. 2A to FIG. 2F show steps according to the first embodiment of the present application.

In the step S10, as shown in FIG. 2A, the operational device 10 according to the present embodiment uses the endoscope 20 as a first image capturing unit for acquiring the image of a reference object 2 and generating reference image data 202. The operational device 10 uses the narrow-band endoscope 22 as a second image capturing unit for acquiring the image of a reference object 2 and generating narrow-band reference image data 222. In addition, the endoscope 20 and the narrow-band endoscope 22 transmit the reference image data 202 and the narrow-band reference image data 222 to the operational device 10. The reference image data 202 according to the present embodiment are the white-light image data acquired by using the white light image (WLI) technique. According to the present embodiment, the endoscope 20 is the white-light endoscope OLYMPUS® EVIS LUCERA CV-260 SL to obtain the corresponding white-light image data; the narrow-band endoscope 22 is the OLYMPUS® EVIS LUCERA CV-290 to obtain the corresponding narrow-band image data using the narrow band imaging technique. Besides, the present embodiment adopts different endoscopes. Nonetheless, the present application is not limited to the examples. CV-290 further includes a white-light imaging module for achieving white-light imaging. Thereby, it can be an embodiment of the endoscope 20 as well. Moreover, CV-260 SL also includes a narrow-band imaging module for achieving narrow-band imaging. There, CV-260 SL can be an embodiment of the narrow-band endoscope 22, too. In other words, the endoscope 20 and the narrow-band endoscope 22 can be taken roles of the same endoscope, which includes the first image capturing unit and the second image capturing unit.

The reference object 2 according to the present embodiment is the corresponding 24 Color Checkers (X-Rite Classic) of the visible light band (namely, wavelength 380 nm to 780 nm). For example, the 24 Color Checkers include white, black, four neutral grays, blue, green, red, yellow, magenta, cyan, orange, violet-blue, medium red, purple, yellow-green and orange-yellow, dark skin color, light skin color, sky blue, leaf color, blue flower color, and blue-green.

Figure 2B:
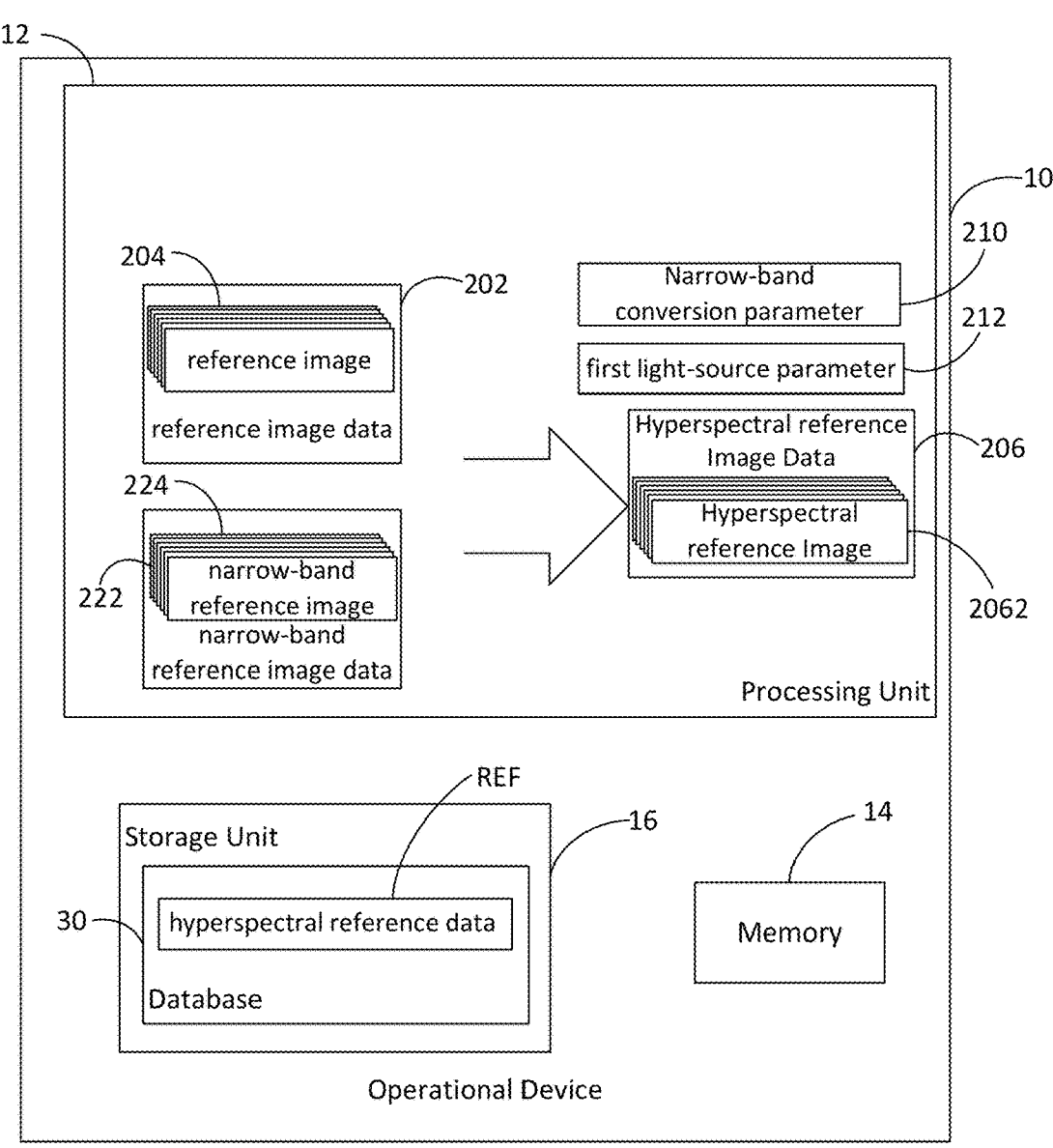

The operational device 10 executes the step S12. As shown in FIG. 2B, the operational device 10 reads hyperspectral reference data REF from the database 30 and coverts the reference image 204 of the reference image data 202 to a plurality of hyperspectral reference images 2062 of the hyperspectral reference image data 206. In other words, the visible hyperspectral algorithm (VIS-HSA) is used to execute data operations on the reference image 204 acquired by the endoscope 20 to obtain the hyperspectral reference image 2062 by converting from the general image color space (namely, the color space of the acquired image) to the XYZ color space (1931XYZ Color space), for example, from the sRGB color space to the XYZ color space). The hyperspectral reference data REF of the present application is corresponding visible band of the visible-light hyperspectral technique and corresponding to the 24 Color Checkers. For example, the 24 Color Checkers include white, black, four neutral grays, blue, green, red, yellow, magenta, cyan, orange, violet-blue, medium red, purple, yellow-green and orange-yellow, dark skin color, light skin color, sky blue, leaf color, blue flower color, and blue-green. The hyperspectral reference data REF correspond to the above reference image data 202 and include a gamma function, a calibration matrix, and a chromatic adaptation transformation matrix corresponding to a plurality of color matching functions (CMF) of the 24 Color Checkers.

The equations are shown as follows:

$$\begin{bmatrix} X \\ Y \\ Z \end{bmatrix} = [M_A][T] \begin{bmatrix} f(R_{SRGB}) \\ f(G_{SRGB}) \\ f(B_{SRGB}) \end{bmatrix} \times 100, 0 \le \begin{matrix} R_{SRGB} \\ G_{SRGB} \\ B_{SRGB} \end{matrix} \le 1 \qquad \text{Equation 1}$$

$$V_{Color} = [XYZ\ XY\ YZ\ XZ\ X\ Y\ Z]^T \qquad \text{Equation 2}$$

$$[M] = [\text{Score}] \times pinv([V_{Color}]) \qquad \text{Equation 3}$$

$$[S_{Spectrum}]_{380-780} = [EV][M][V_{Color}] \qquad \text{Equation 4}$$

where $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \qquad \text{Equation 5}$$

$$f(n) = \begin{cases} \left(\dfrac{n+0.055}{1.055}\right), & n > 0.04045 \\ \left(\dfrac{n}{12.92}\right), & \text{otherwise} \end{cases} \qquad \text{Equation 6}$$

$$[M_A] = \begin{bmatrix} X_{SW}/X_{CW} & 0 & 0 \\ 0 & Y_{SW}/X_{CW} & 0 \\ 0 & 0 & Z_{SW}/Z_{CW} \end{bmatrix} \qquad \text{Equation 7}$$

$f(n)$ is the gamma function. T is the transformation matrix. $[M_A]$ is the chromatic adaptation transformation matrix. [EV] is the principal component, which is also the characteristic data of the reference image data. [Score] is the characteristic value of the principal component.

The processing unit 12 converts the sRGB values of the reference image 204 to the XYZ color space by using Equation 1. The XYZ color space values are substituted into the calibration matrix C in Equation 2. Finally, the acquired [EV] and [M] and Equations 1 and 2 are substituted into Equation 4 to obtain $[S_{Spectrum}]_{380-780}$, which is the hyperspectral reference image data 206 of the visible band. In addition, by calibrating using Equation 4, the corresponding narrow-band conversion parameter 210 and the first light-source parameter 212 will be deduced.

The operational device 10 can further execute a principal component analysis (PCA) on the reference image data 202 acquired in step S10 to simplify the image values and filter out the image values with lower variation for simplifying and generating the corresponding dimensionally reduced image data according to the corresponding characteristic vector of the reference image data 202. The dimensionally reduced image data include a plurality of dimensionally reduced images. The following is an example of the PCA operation, as shown in Equation 8:

$$y_i = a_{j1}(x_{1i} - \bar{x}_1) + a_{j2}(x_{2i} - \bar{x}_2) + \ldots + a_{jn}(x_{ni} - \bar{x}_n) \qquad \text{Equation 8}$$

$x_{1i}$ to $x_{ni}$ represent the spectrum intensity values of the first to the n-th wavelength. $\bar{x}_1$ to $\bar{x}_n$ represent the spectrum expectation values (average spectrum expectation values) of the first to the n-th wavelength. $a_{j1}$ to $a_{jn}$ represent the characteristic vector coefficients the covariance matrix in spectrum covariance operations. For example, after the principal component analysis method is used to reduce the dimensionality of high-dimensional spectrum data, only the first three dimensions are reserved to reduce the computational complexity. The general method is to convert a color image into a grayscale image, that is, to remove the chroma image, thus reducing the computational complexity.

In the following, the step S12 will be further illustrated. As shown in FIG. 3, the step S12 further includes:

Step S122: Acquiring reference spectrum and reflection reference spectrum according to reference image data;

Step S124: Acquiring narrow-band reference spectrum and a narrow-band reflection reference spectrum according to narrow-band reference image data;

Step S126: Acquiring spectral reflectance space parameter from reflection reference spectrum and narrow-band reflection reference spectrum according to reflection spectrum space transformation function;

Step S128: Acquiring first light-source parameter from reference spectrum and narrow-band reflection reference spectrum according to spectral space transformation function;

Step S140: Acquiring calibration matrix according to spectral reflectance space parameter and first light-source parameter;

Step S142: Acquiring calibration space parameters and hyperspectral reference image data according to calibration matrix and spectral reflectance space parameter; and Step S144: Acquiring narrow-band conversion parameter according to calibration space parameters, reflection reference spectrum, and narrow-band reflection reference spectrum.

Figure 4A:
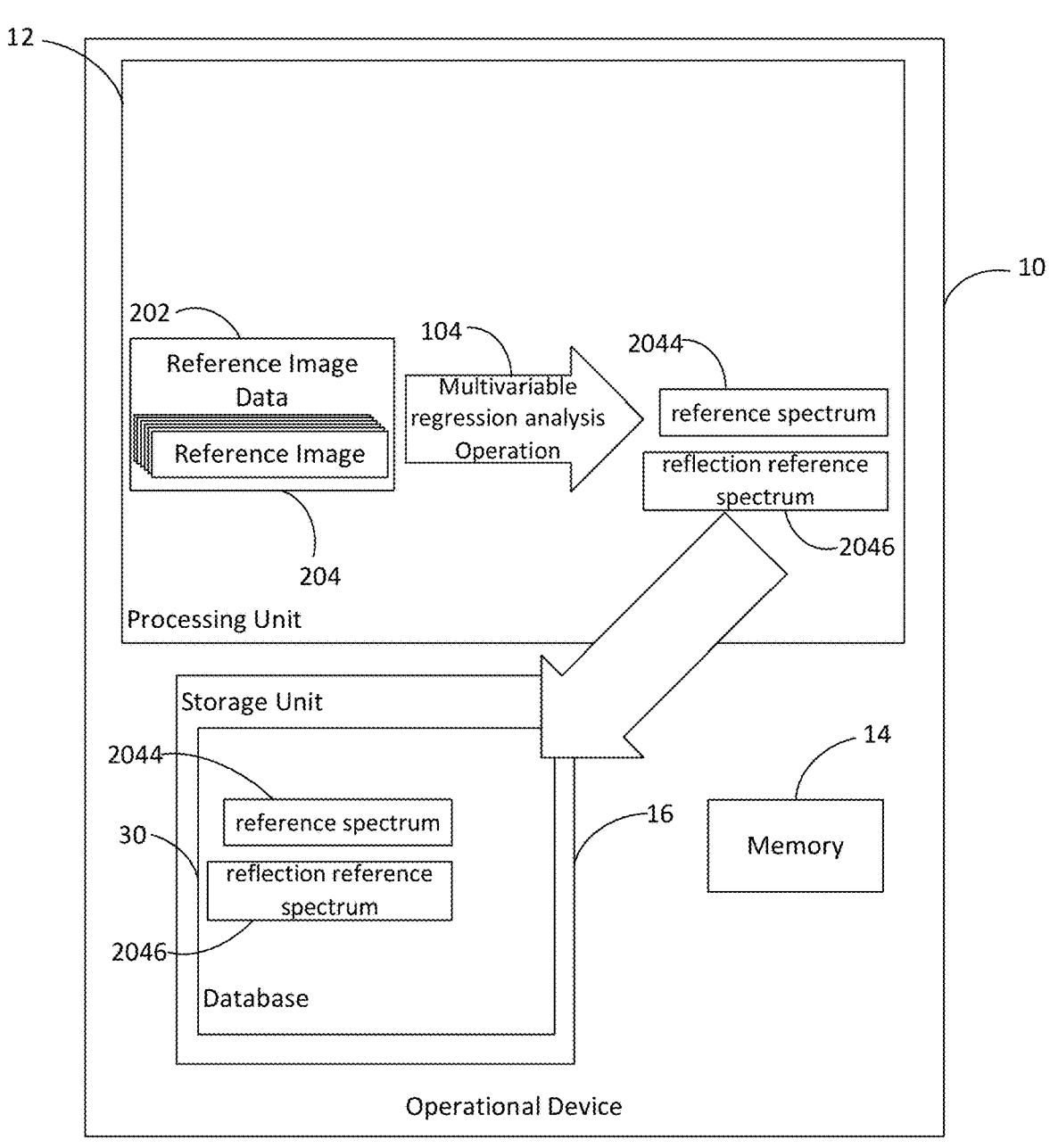
FIG. 4A to FIG. 4G show steps of operating the narrow-band conversion parameter and the first light-source parameter according to the first embodiment of the present application.

As shown in FIG. 4A, the operational device 10 executes the step S122 for acquiring a reference spectrum 2044 and a reflection reference spectrum 2046 according to the reference image data 204. The white-light endoscope, OLYMPUS® EVIS LUCERA CV-260 SL, acquires the image of the reference object 2 to obtain the reference image data 202 such as 24 Color Checkers. The reference spectrum 2044 includes the image spectrum of each color sRGB in the 24 Color Checkers. The reflection reference spectrum 2046 includes the reflection spectrum of each color in the 24 Color Checkers. The reference spectrum 2044 and the reflection reference spectrum 2046 are stored in the database 30.

Figure 4B:
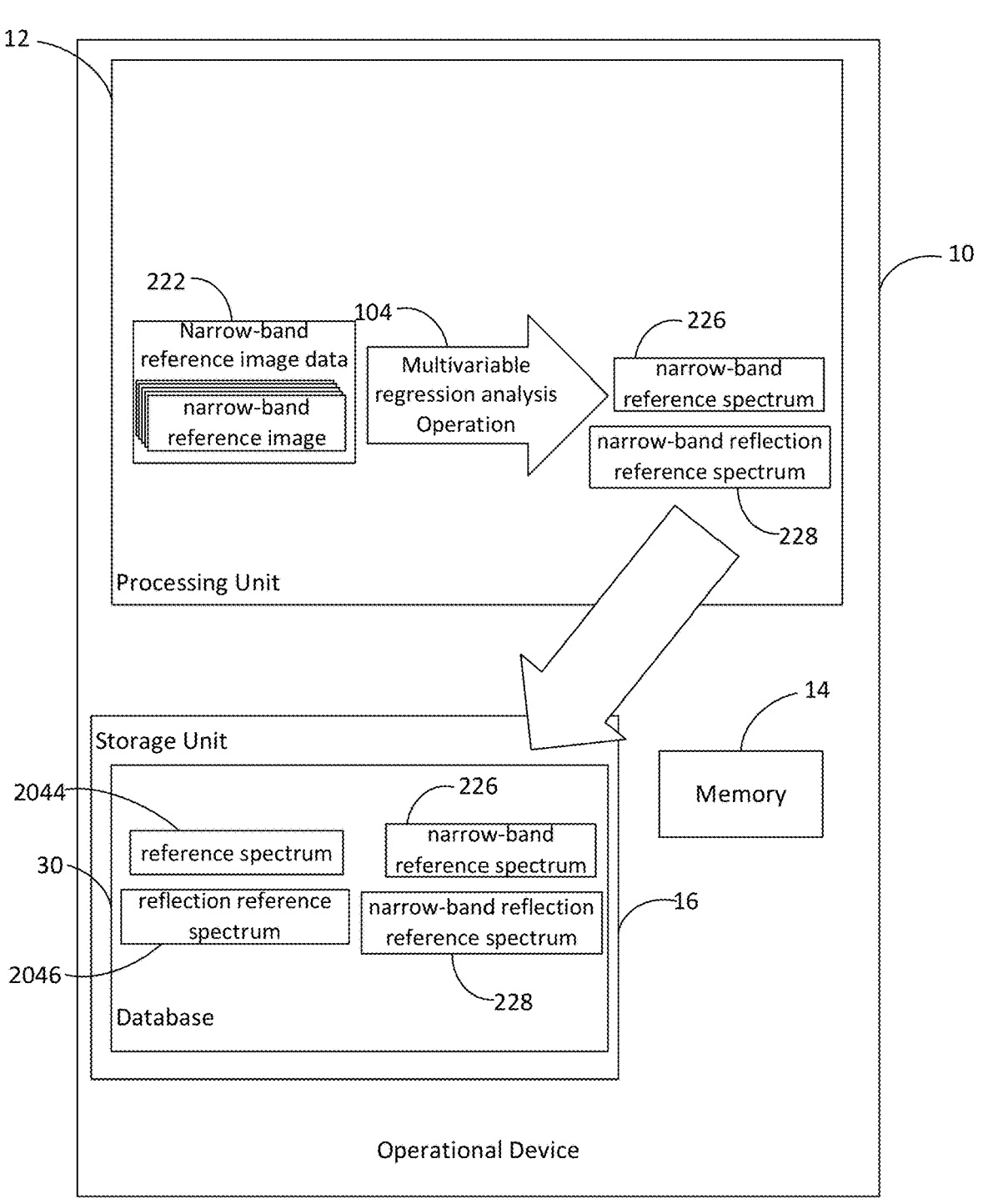

As shown in FIG. 4B, the operational device 10 executes the step S124 for acquiring a narrow-band reference spectrum 226 and a narrow-band reflection reference spectrum 228 according to the narrow-band reference image data 222. The white-light endoscope OLYMPUS® EVIS LUCERA CV-290 acquires the narrow-band reference image 224 of each color in the 24 Color Checkers and the narrow-band reference spectrum 226 and the narrow-band reflection reference spectrum 228 from the narrow-band reflection spectrum of the 24 Color Checkers. The narrow-band reference spectrum 226 and the narrow-band reflection reference spectrum 228 are stored in the database 30.

Figure 4C:
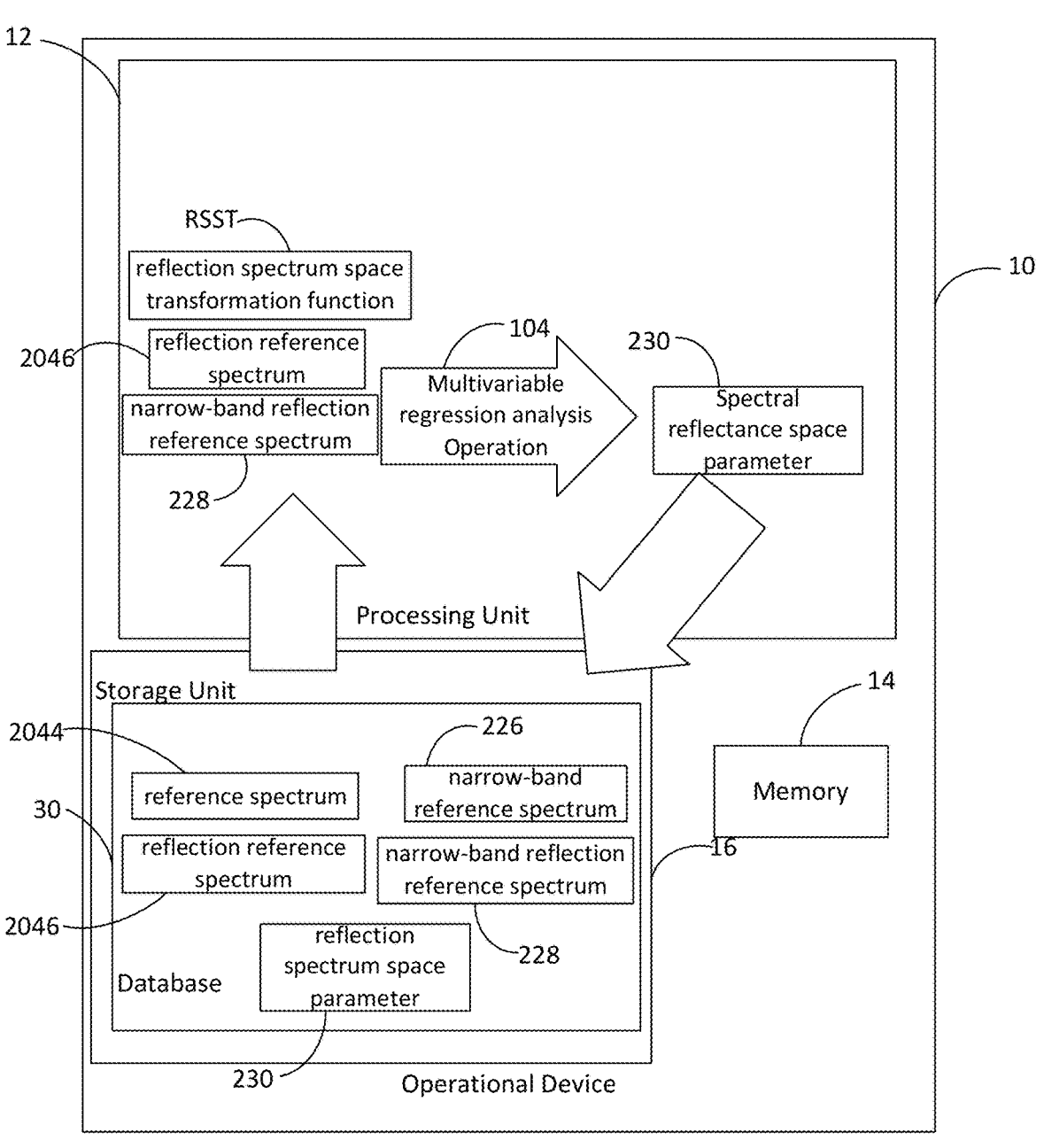

As shown in FIG. 4C, the operational device 10 executes the step S126 for acquiring a spectral reflectance space parameter 230 from the reflection reference spectrum 2046 and the narrow-band reflection reference spectrum 228 according to a reflection spectrum space transformation function RSST. The reflection spectrum space transformation function RSST is operated using Equation 1 and Equations 5~7.

To convert the reflection spectrum data to the XYZ color space, Equations 9~12 can be used as follows:

$$X = k \int_{380\,nm}^{780\,nm} S(\lambda)R(\lambda)\bar{x}(\lambda)d\lambda \qquad \text{Equation 9}$$

$$Y = k \int_{380\,nm}^{780\,nm} S(\lambda)R(\lambda)\bar{y}(\lambda)d\lambda \qquad \text{Equation 10}$$

$$Z = k \int_{380\,nm}^{780\,nm} S(\lambda)R(\lambda)\bar{z}(\lambda)d\lambda \qquad \text{Equation 11}$$

where k is shown as Equation 12 below:

$$k = 100 \int_{380\,nm}^{780\,nm} S(\lambda)\bar{y}(\lambda)d\lambda \qquad \text{Equation 12}$$

$\tilde{x}(\lambda)$, $\tilde{y}(\lambda)$, and $\tilde{z}(\lambda)$ are color matching functions. $S(\lambda)$ is the light-source spectrum of endoscope. Since the Y value in the XYZ color space is proportional to the brightness, the maximum brightness of the light-source spectrum can be acquired by using Equation 10. Then define the maximum Y value as 100 to obtain the brightness ratio k. Then, Equations 9~11 are used to obtain [XYZ$_{Spectrum}$], which are the spectral reflectance space parameter and stored to the database 30.

Figure 4D:
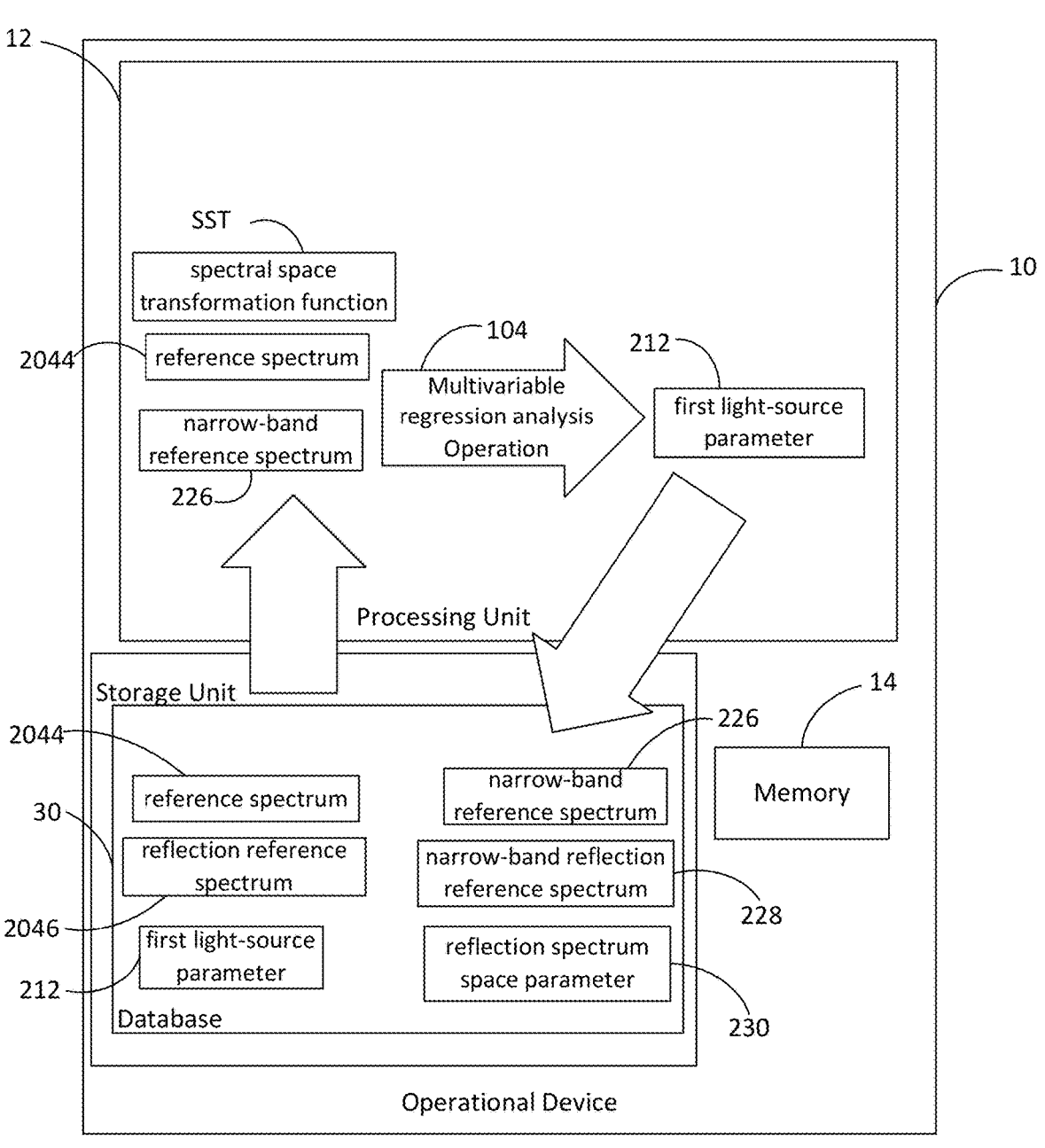

As shown in FIG. 4D, the operational device 10 executes the step S128 for acquiring the first light-source parameter 212 from the reference spectrum 2044 and the narrow-band reference spectrum 226 according to a spectral space transformation function SST. The reference spectrum 2044 and the narrow-band reflection reference spectrum 226 should be converted to the same XYZ color space. The spectral space transformation function SST can be operated using Equation 1 and Equations 5~7.

Equation 1 shows how to convert from the sRGB color space to the XYZ color space. Because the endoscope images are stored using the sRGB color space, the R, G, and B values (0~255) of an endoscope image should be converted to a small-scale range (0~1) before converting them to linear RGB values using Equation 3. Finally, by using Equation 1 and Equations 9 to 11, the linear RGB values can be converted to the XYZ values in the XYZ color space. In the conversion process, the chromatic adaptation transformation matrix [M$_A$] in Equation 7 is used for modification. This is because the white point defined in the sRGB color space is D65 (XCW, YCW, ZCW), which is different from the white point (XSW, YSW, ZSW) of the light source for response correction is executed using a third-order equation. The following Equation 14 is used to calibrate the nonlinear response of endoscope:

$$V_{Non-linear} = \begin{bmatrix} X^3 & Y^3 & Z^3 & X^2 & Y^2 & Z^2 & X & Y & Z & 1 \end{bmatrix}^T \qquad \text{Equation 14}$$

Generally, the dark current in an endoscope is a fixed value and will not change significantly with changes in the amount of incident light. Therefore, the influence of the dark current is defined as a constant, and the calibration variable of the dark current is defined as $V_{Dark}$. The following Equation 15 calibrates the influence of dark current:

$$V_{Dark} = [\alpha] \qquad \text{Equation 15}$$

The calibration variable of inaccuracy in color separation and color shift of color filter is defined as $V_{Color}$. $\tilde{x}(\lambda)$, $\tilde{y}(\lambda)$, and $\tilde{z}(\lambda)$ are color matching functions from the RGB color space to the XYZ color space. Thereby, according to the correlation among $\tilde{x}(\lambda)$, $\tilde{y}(\lambda)$, and $\tilde{z}(\lambda)$, the permutations of X, Y, Z are listed in Equation 16 below for calibrating inaccuracy in color separation and color shift of color filter for endoscope images.

$$V_{Color} = [XYZ \ XY \ YZ \ XZ \ X \ Y \ Z]^T \qquad \text{Equation 16}$$

By using the above Equations 14~16, the calibrated variable matrix V is deduced in the following Equation 17:

$$V = \begin{bmatrix} X^3Y^3Z^3 & X^2Y & X^2Z & Y^2Z & XZ^2 & YZ^2 & XYZX^2Y^2 & Z^2 & XY & YZ & XZ & X & Y & Z & \alpha \end{bmatrix}^T \qquad \text{Equation 17}$$

measurement. Consequently, by using the chromatic adaptation transformation matrix [M$_A$] in Equation 7, the light-source parameter of the endoscope 20 [XYZ$_{Endoscope}$], namely, the first light-source parameter 212, will be obtained. The first light-source parameter 212 are stored in the database 30.

Figure 4E:
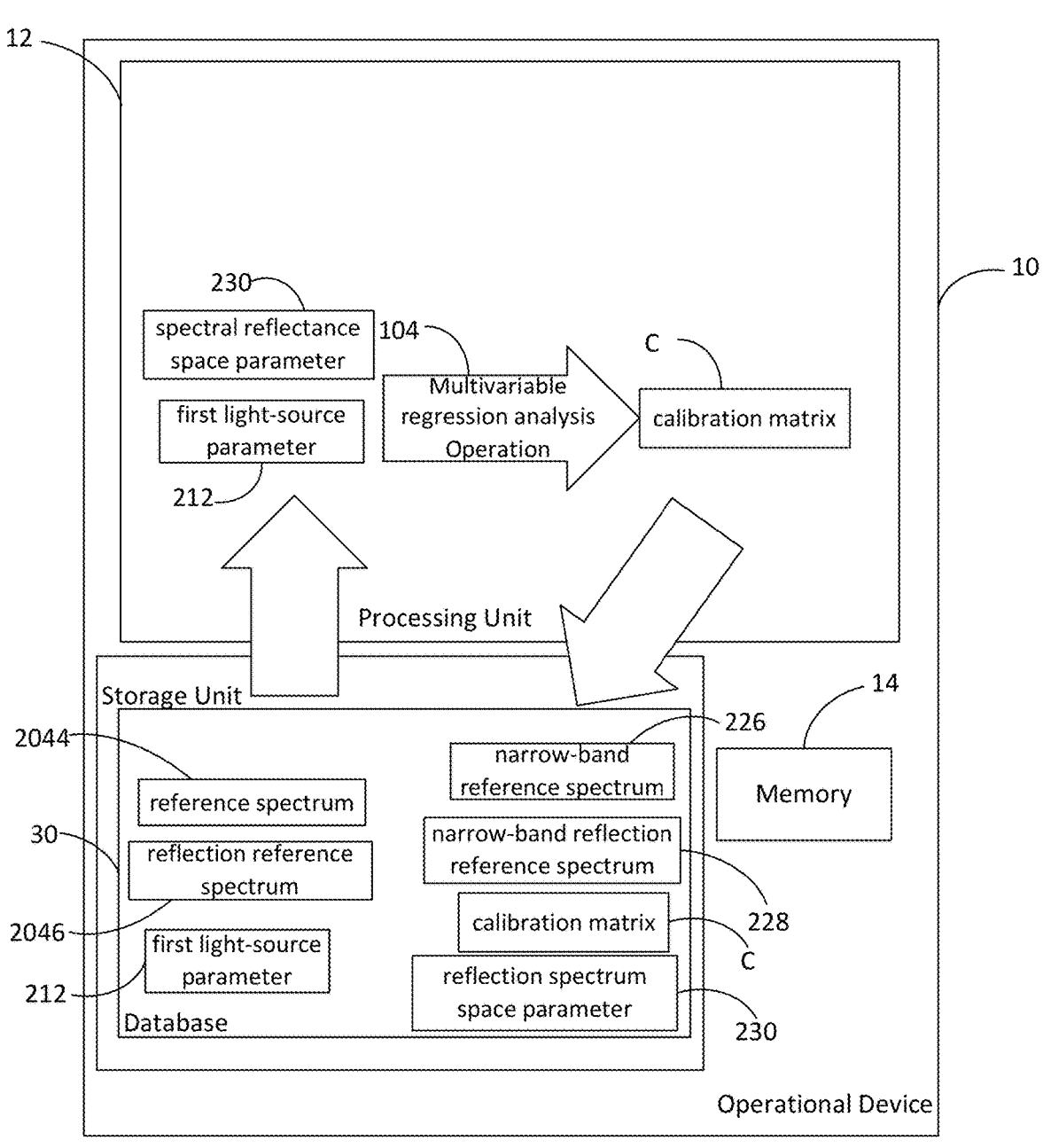

As shown in FIG. 4E, the operational device 10 executes the step S140 for acquiring a calibration matrix C according to the spectral reflectance space parameter 230 and the first light-source parameter 212. The calibration matrix C uses the spectral reflectance space parameter 230, namely, [XYZ$_{Spectrum}$], as the standard. The transformation matrix [X Y Z]$^T$ from the first light-source parameter 212 is extended a variable matrix V having the calibration variables.

Continued, the variable matrix V is obtained according to many error factors may cause in endoscope shooting. The error factors are nonlinear response, dark current, inaccuracy in color separation and color shift of color filter (for example: white balance), respectively. Execute multivariable regression analysis using the following Equation 13 to obtain the calibration matrix C for calibrating the endoscope.

$$[C] = [XYZ_{Spectrum}] \times pinv([V]) \qquad \text{Equation 13}$$

Since narrow band images and white light images are approximate in third-order operations, the nonlinear Finally, Equation 13 is used to deduce the corresponding calibration matrix C of endoscope and the calibration matrix C is stored to the database 30.

Figure 4F:
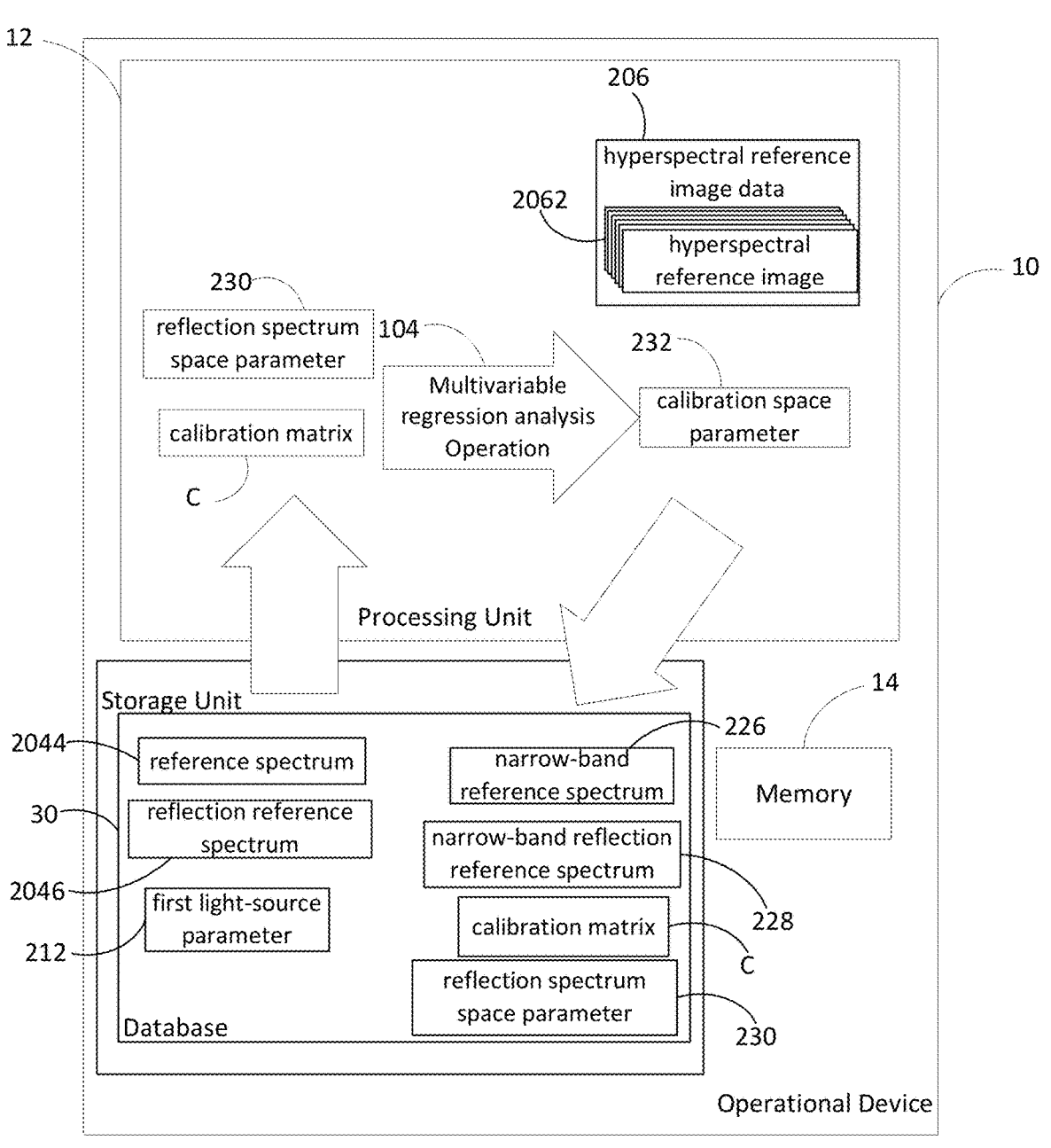

As shown in FIG. 4F, the operational device 10 executes the step S142 for acquiring a calibration space parameter 232 from the spectral reflectance space parameter 230 according to the calibration matrix C. By using the variable matrix V in Equation 17 along with the calibration matrix C, the X, Y, Z calibration parameters [XYZ$_{Correct}$], namely, calibration space parameters 232, are obtain, as Equation 18 below:

$$[XYZ_{Correct}] = [C] \times [V] \qquad \text{Equation 18}$$

The average error of white light images in [XYZ$_{Correct}$] and [XYZ$_{Spectrum}$] is 1.40. The average error of narrow band images in [XYZ$_{Correct}$] and [XYZ$_{Spectrum}$] is 2.39.

Since the above operation uses the visible-light band of 380 nanometers to 780 nanometers, the calibration results of endoscope must be expressed in chromatic aberration. To convert [XYZ$_{Correct}$] and [XYZ$_{Spectrum}$] to the corresponding Lab color space of the CIEDE2000, the following Equations 19~22 can be used:

$$L^* = 116 f\left(\frac{Y}{Y_n}\right) - 16 \qquad \text{Equation 19}$$

-continued $$a^* = 500\left[f\left(\frac{X}{X_n}\right) - f\left(\frac{Y}{Y_n}\right)\right] \qquad \text{Equation 20}$$

$$b^* = 200\left[f\left(\frac{Y}{Y_n}\right) - f\left(\frac{Z}{Z_n}\right)\right] \qquad \text{Equation 21}$$

$f(n)$ is shown in Equation 22 below:

$$f(n) = \begin{cases} n^{\frac{1}{3}}, & n > 0.008856 \\ 7.787n + 0.137931, & \text{otherwise} \end{cases} \qquad \text{Equation 22}$$

Figure 4G:
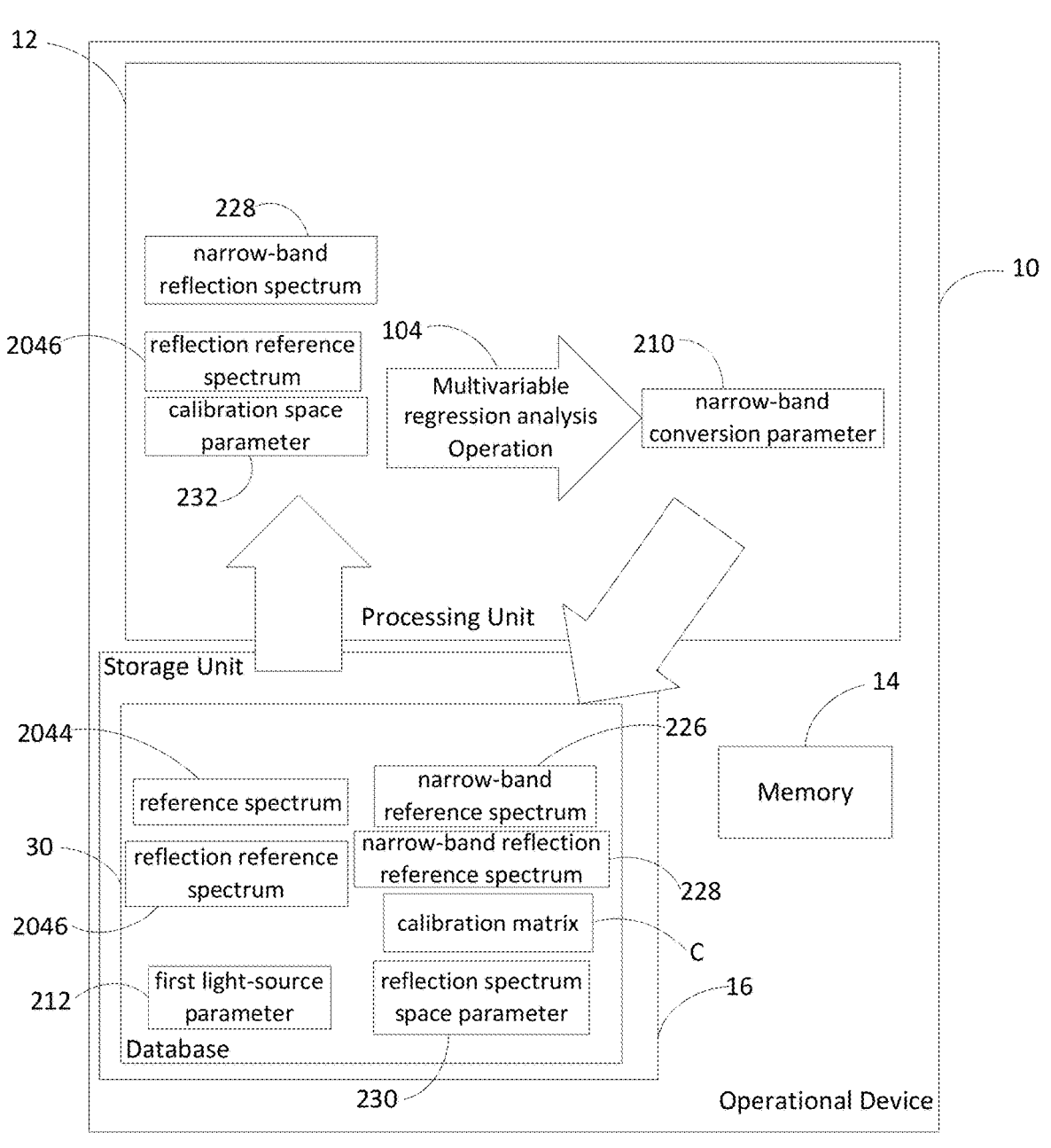

As shown in FIG. 4G, by using the calibration parameter $[XYZ_{Correct}]$ deduced by using the calibrated endoscope and the white-light and narrow-band reflection spectra measured by a spectrum analyzer, the transformation matrix M will be operated, as shown in Equation 23. According to Equation 24, a general image can be converted to the hyperspectral image, for example, the reference image 204 is converted to the hyperspectral reference image 2062.

$$[M] = [\text{Score}] \times pinv([V_{Color}]) \qquad \text{Equation 23}$$

$$[S_{Spectrum}]_{380-780} = [EV][M][V_{Color}] \qquad \text{Equation 24}$$

Wherein [Score] is the complex principal components (EVs) obtained using the principal component regression analysis method on the reflection spectrum data $[R_{Spectrum}]$. According to the first embodiment, 10 sets of principal component analysis operations 102 with better the explanatory power (the total weight percentage exceeding 99.99%) are executed by dimensionality reduction operations, obtaining the simulated spectrum $[S_{Spectrum}]_{380-780}$ using Equation 21. The error between the simulated spectrum $[S_{Spectrum}]_{380-780}$ and the corresponding $[XYZ_{Spectrum}]$ of the reference image is reduced from 11.60 to 2.85, thereby achieving a color error that cannot be easily discerned by the naked eye. For example: the simulated spectrum $[S_{Spectrum}]_{380-780}$ can be simulated from the reference image 204 to the better hyperspectral reference image 2062 in the visible-light band.

Finally, the operational device 10 executes the step S144 for acquiring the narrow-band conversion parameter 210 according to the calibration space parameter 232, the reflection reference spectrum 2046, and the narrow-band reflection spectrum 228, as shown in Equations 1~11. In other words, Equation 24 is used for adjusting to a preferred hyperspectral image suitable for narrow band. Thereby, the simulated spectrum $[S_{Spectrum}]_{380-780}$ is transformed into an image in the narrow-band range.

Figure 2C:
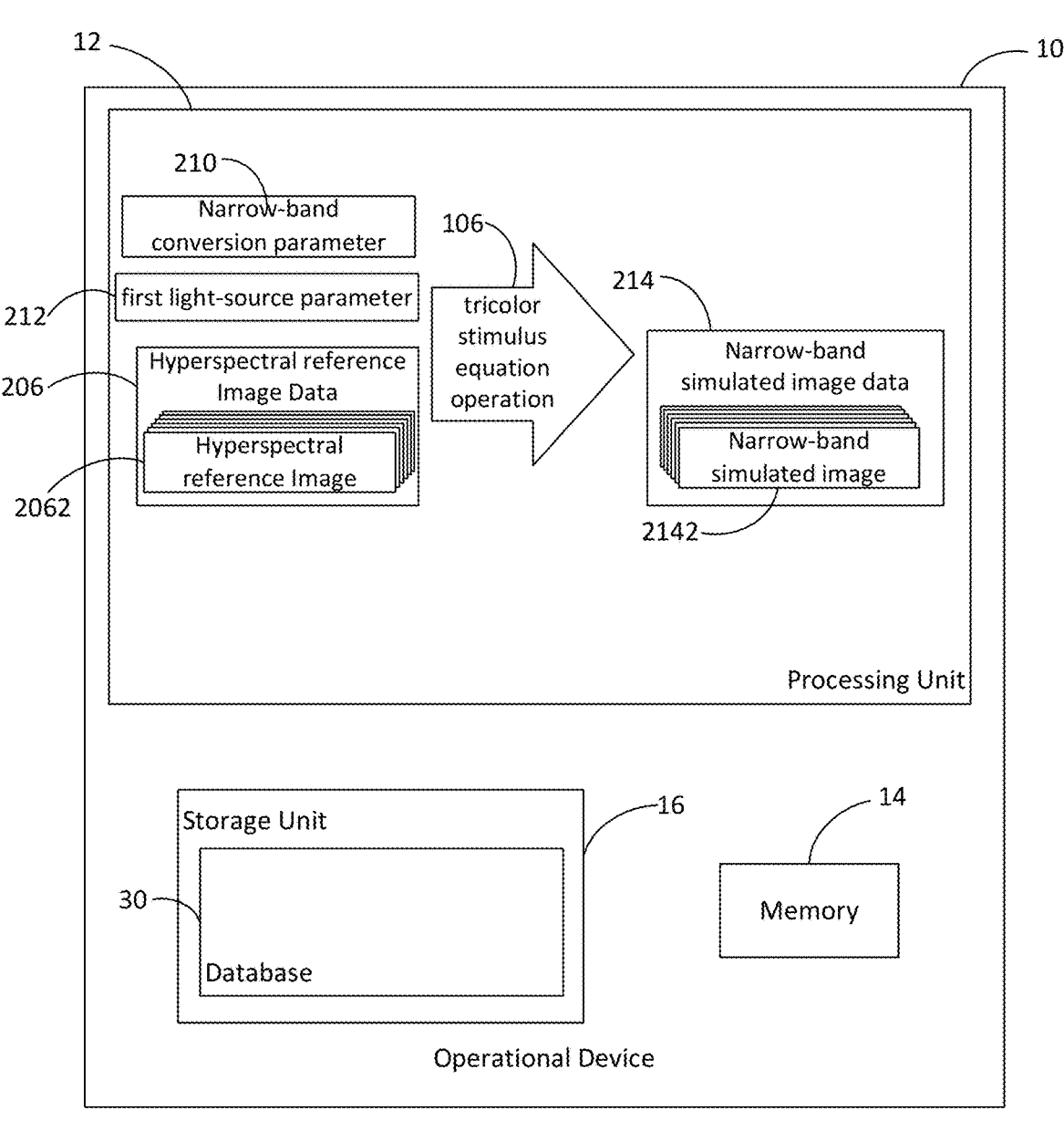

Furthermore, in the step S16, as shown in FIG. 2C, the processing unit 12 of the operational device 10 executes a tricolor stimulus equation operation 106 on the hyperspectral image of the reference image data 202, the narrow-band conversion parameter 210, and the first light-source parameter 212 for generating narrow-band simulated image data 214. According to the present embodiment, each hyperspectral reference image 2062 of the hyperspectral reference image data 206 is used to obtain the corresponding plurality of narrowband simulated images 2142 of the narrow-band simulated image data 214 according to the narrow-band conversion parameter s210 and the first light-source parameter 212. In other words, the corresponding band of the narrow-band simulated image 2142 is the corresponding first target band parameter of the first light-source parameter 212. The tricolor stimulus values refer to the amount of stimulation of the three primary colors that cause the human retina to sense a certain color. The present embodiment refers to the comparison of the hyperspectral reference image data 206, the narrow-band conversion parameter 210, and the first light-source parameter 212. As a result, the narrow-band simulated image data 214 is obtained.

Figure 2D:
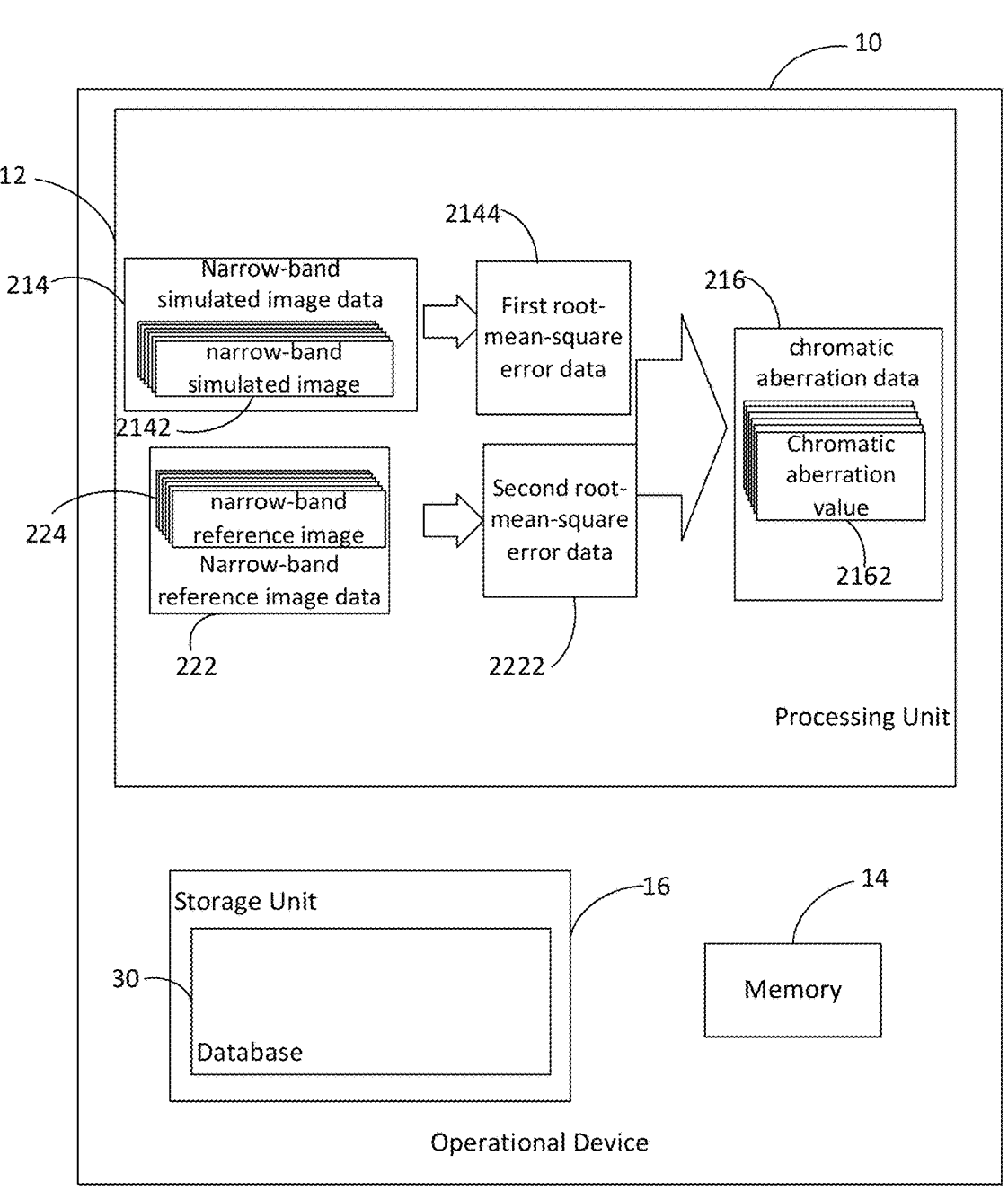

Next, in the step S18, as shown in FIG. 2D, according to the present embodiment, the operational device 10 compares the narrow-band reference image 224 of the narrow-band reference image data 222 according to the narrow-band simulated image 2142 of the narrow-band simulated image data 214 to obtain chromatic aberration data 216, which include a plurality of conversion chromatic aberration values 2162. For example, the narrow-band simulated image data 214 of the reference object 2 is compared with the narrow-band reference image data 222 of the reference object 2 to obtain the corresponding chromatic aberration data 216 of the reference object 2, namely, the plurality of conversion chromatic aberration values 2162. Furthermore, the operational device 10 executes data operations to obtain a first root-mean-square error 2144 and a second root-mean-square error 2222 of the narrow-band simulated image data 2142 and the narrow-band reference image data 22. The first root-mean-square error 2144 and the second root-mean-square error 2222 are compared to obtain the chromatic aberration data 216, as shown in Table 1 below. The chromatic aberration values are obtained using the chromatic aberration formula CIEDE2000.

TABLE 1

| Reference object, chromatic aberration values of 24 Color Checkers | |
|---|---|
| Color Checker No. | Chromatic aberration value |
| 1 | 5.112 |
| 2 | 2.69 |
| 3 | 2.06 |
| 4 | 9.90 |
| 5 | 6.49 |
| 6 | 3.95 |
| 7 | 8.44 |
| 8 | 2.33 |
| 9 | 3.93 |
| 10 | 4.22 |
| 11 | 5.59 |
| 12 | 7.91 |
| 13 | 11.41 |
| 14 | 2.10 |
| 15 | 8.98 |
| 16 | 5.96 |
| 17 | 5.70 |
| 18 | 7.16 |
| 19 | 1.98 |
| 20 | 3.05 |
| 21 | 5.65 |
| 22 | 4.45 |
| 23 | 4.17 |
| 24 | 5.17 |

CIEDE2000 first converts the narrow-band simulated image data 214 and the narrow-band reference image data 222 to the L\*a\*b color coordinate system for operation. The intermediate operation process converts the narrow-band simulated image data 214 and the narrow-band reference image data 222 to the L\*C\*h\* color space and uses hue compensation to obtain better chromatic aberration values. CIEDE2000 is a conventional chromatic aberration formula. Hence, the details will not be described.

Figure 2E:
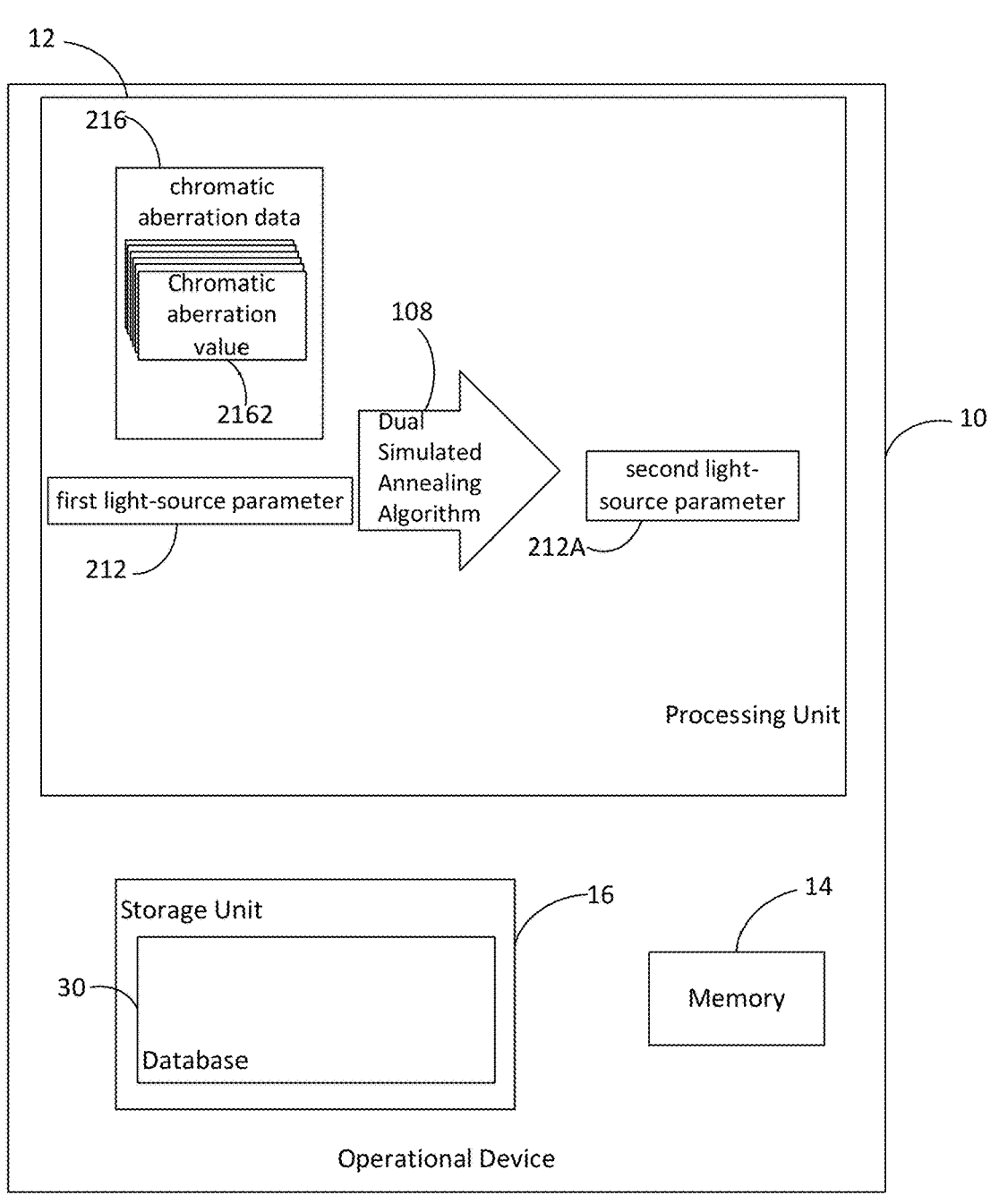

Then, in the step S18, as shown in FIG. 2E, the processing unit 12 generates second light-source parameter 212A according to the chromatic aberration data 216 and the first light-source parameter 212 generated in the step S20. According to the present embodiment, the processing unit 12 executes a dual simulated annealing algorithm 108. By operating the gamma function included in the first light-source parameter 212 according to the chromatic aberration data 216, the second light-source parameter 212A is obtained, which corresponds to or is close to the gamma function included in the narrow-band reference image data 222. Nonetheless, the present application is not limited to the double simulated annealing algorithm 108, but can also be the genetic algorithm (GA), particle swarm optimization (PSO), differential evolution algorithm, support vector machine, and other algorithms that enable the processing unit 12 to obtain the best solution of the second light-source parameter 212A according to the chromatic aberration data 216 and the first light-source parameter 212.

Figure 5:
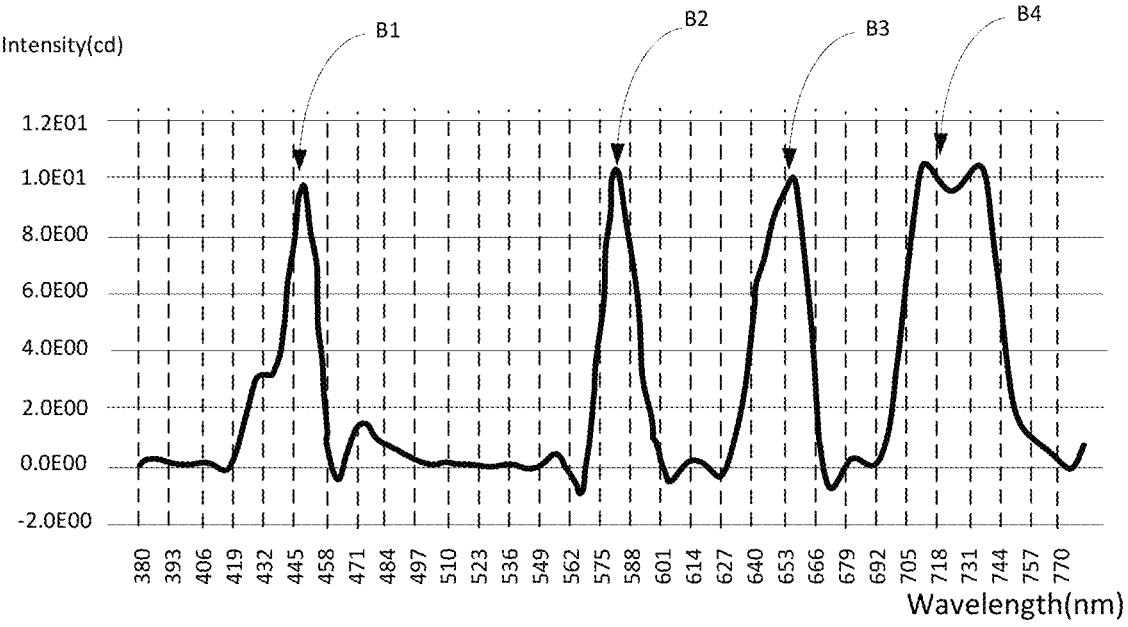
FIG. 5 shows a schematic diagram of the target band according to the first embodiment of the present application.
Figure 6:
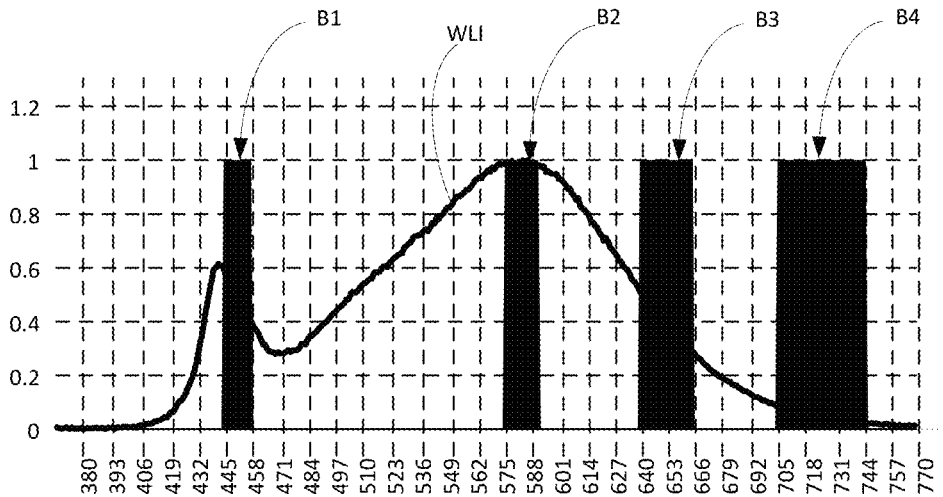
FIG. 6 shows a schematic diagram of the second light-source parameter according to the first embodiment of the present application.

The second target band corresponding to the second light-source parameter 212A is selected from the group consisting of wavelengths 445 nanometers to 458 nanometers, 575 nanometers to 588 nanometers, 640 nanometers to 666 nanometers, and 705 nanometers to 744 nanometers. As shown in FIG. 5, when the narrow-band light source is optimized, the bands with light intensity greater than 6 range from wavelengths 445 nanometers to 458 nanometers, 575 nanometers to 588 nanometers, 640 nanometers to 666 nanometers, and 705 nanometers to 744 nanometers. Therefore, as shown in FIG. 6, this embodiment is based on the first band (445 nanometers to 458 nanometers) B1, the second band (575 nanometers to 588 nanometers) B2, the third band (640 nanometers to 666 nanometers) B3, and the fourth band (705 nanometers to 744 nanometers) B4 to form the second target band. The band combination from the first band B1 to the fourth band B4 is acquired from the entire visible-light band of white light imaging (WLI). That is to say, the corresponding second target band is acquired according to the second light-source parameter 212A.

Figure 2F:
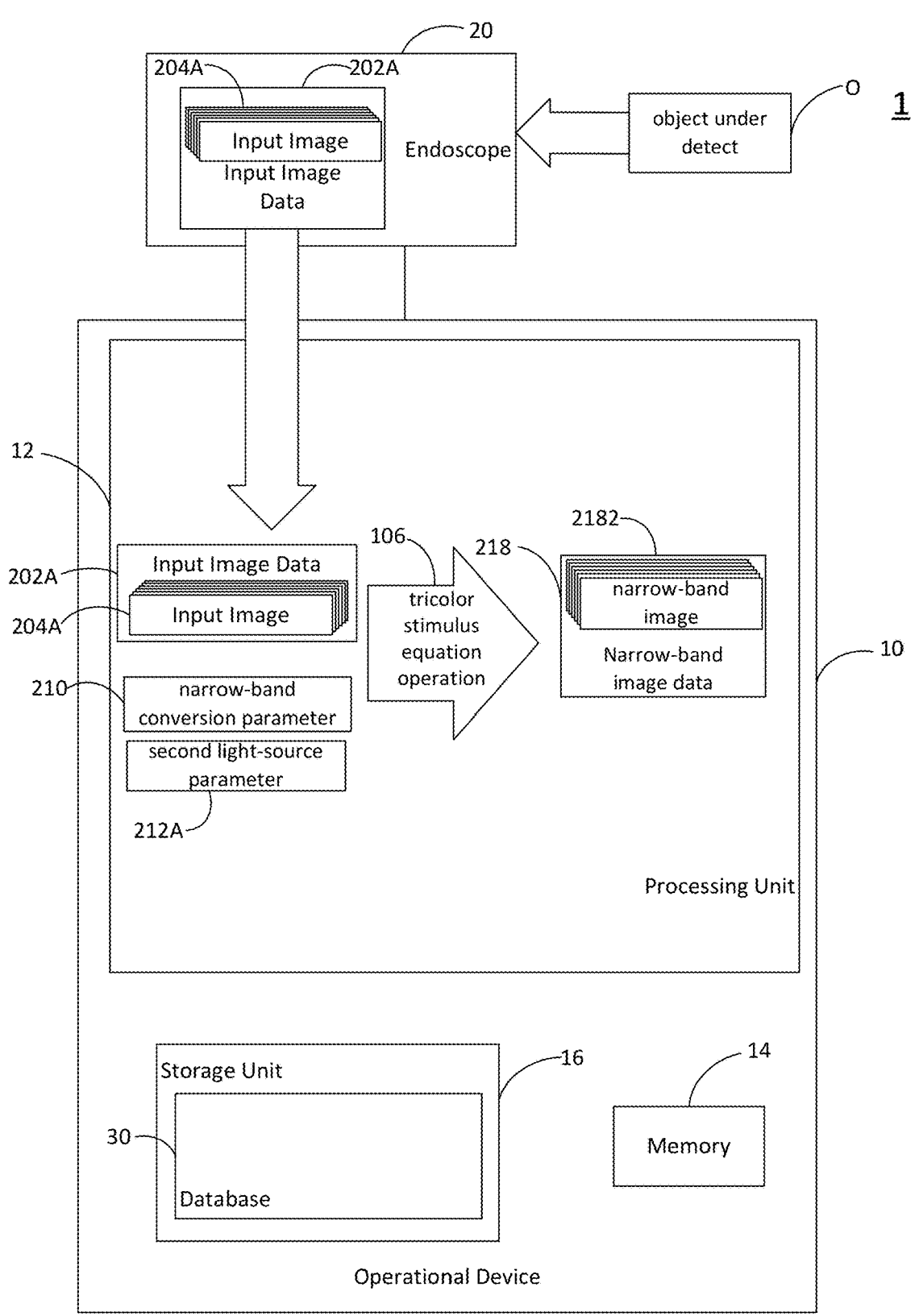

In the step S20, as shown in FIG. 2F, the operational device 10 acquires input image data 202A of an object under detect O using the endoscope 20, which includes a plurality of input images 204A. The operational device 10 then reads the input image data 202A of the endoscope 20, thereby allowing the input image data 202A of the endoscope 20 to be transmitted to the processing unit 12 of the operational device 10. Finally, in step S22, as shown in FIG. 2F, the processing unit 12 executes the tricolor stimulus equation operation 106 based on the narrow-band conversion parameter 210 and the second light-source parameter 212A along with the input image data 202A, thereby obtaining the narrow-band image data 218 of object under detect O. The narrow-band image data 218 include a plurality of narrow-band images 2182. The narrow-band conversion parameter 210 include parameters for converting the input image data 202 into a hyperspectral image and parameters for converting into a narrow-band image. Therefore, the input image 204A of the input image data 202A will first be converted into a hyperspectral image, and then converted into the narrow-band image 2182 for improving the image identification of the input image data 202A and enhancing the clarity of the input image data 202A.

Figure 7:
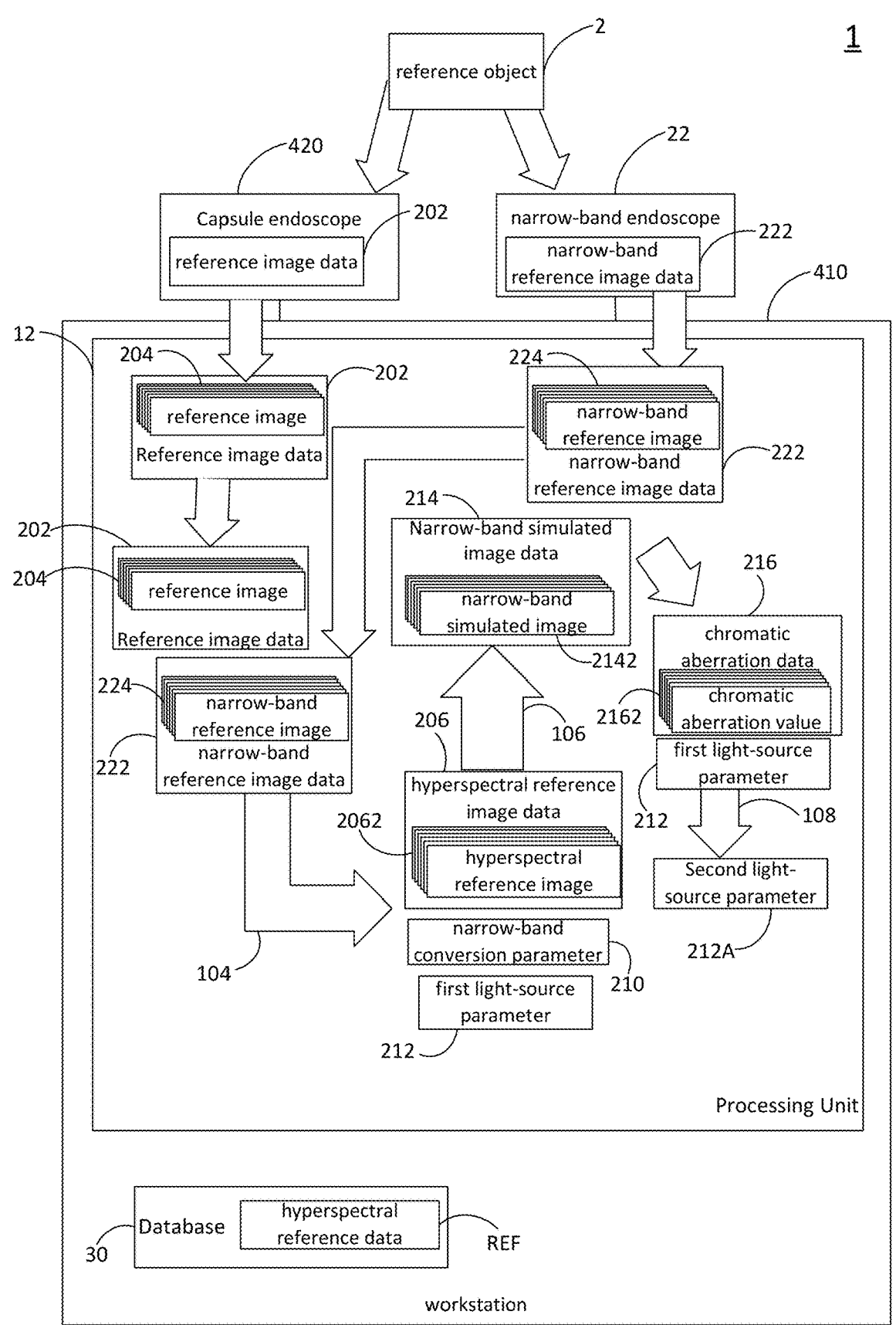
FIG. 7 shows a schematic diagram of acquiring the narrow-band conversion parameter and the second light-source parameter according to the second embodiment of the present application.

As shown in FIG. 7, according to a third embodiment, a workstation 410 is used to connect a capsule endoscope 420 and a narrow-band endoscope 22. The capsule endoscope 420 provides reference image data 202 of the reference object 2 to the workstation 410. A processing unit 12 is provided in the workstation 410. The processing unit 12 reads hyperspectral reference data REF from a database 430, and converts a plurality of reference images 204 of the reference image data 202 into a plurality of hyperspectral reference images 2062 of hyperspectral reference image data 206 according to the hyperspectral reference data REF. Next, acquire a narrow-band conversion parameter 210 and first light-source parameter 212. The processing unit 12 executes the tricolor stimulus equation operation 106 according to the plurality of hyperspectral reference images 2062 of the hyperspectral reference image data 206, the narrow-band conversion parameter 210, and the first light-source parameter 212 to obtain narrow-band simulated image data 214, which include a plurality of narrow-band simulated images 2142. The processing unit 12 compares the narrow-band reference image data 222 of the reference object 2 provided by the narrow-band endoscope 22 according to the reference object 2 according to the narrow-band simulated image data 214. That is to say, to compare the narrow-band simulated image 2142 of the narrow-band simulated image data 214 with the narrow-band reference image 224 of the narrow-band reference image data 222 to obtain chromatic aberration data 216, which include a plurality of chromatic aberration values 2162. The processing unit 12 executes the double simulated annealing algorithm 108 based on the chromatic aberration data 216 and the first light-source parameter 212 to obtain the second light-source parameter 212A, thereby optimizing the light source parameter.

Figure 8:
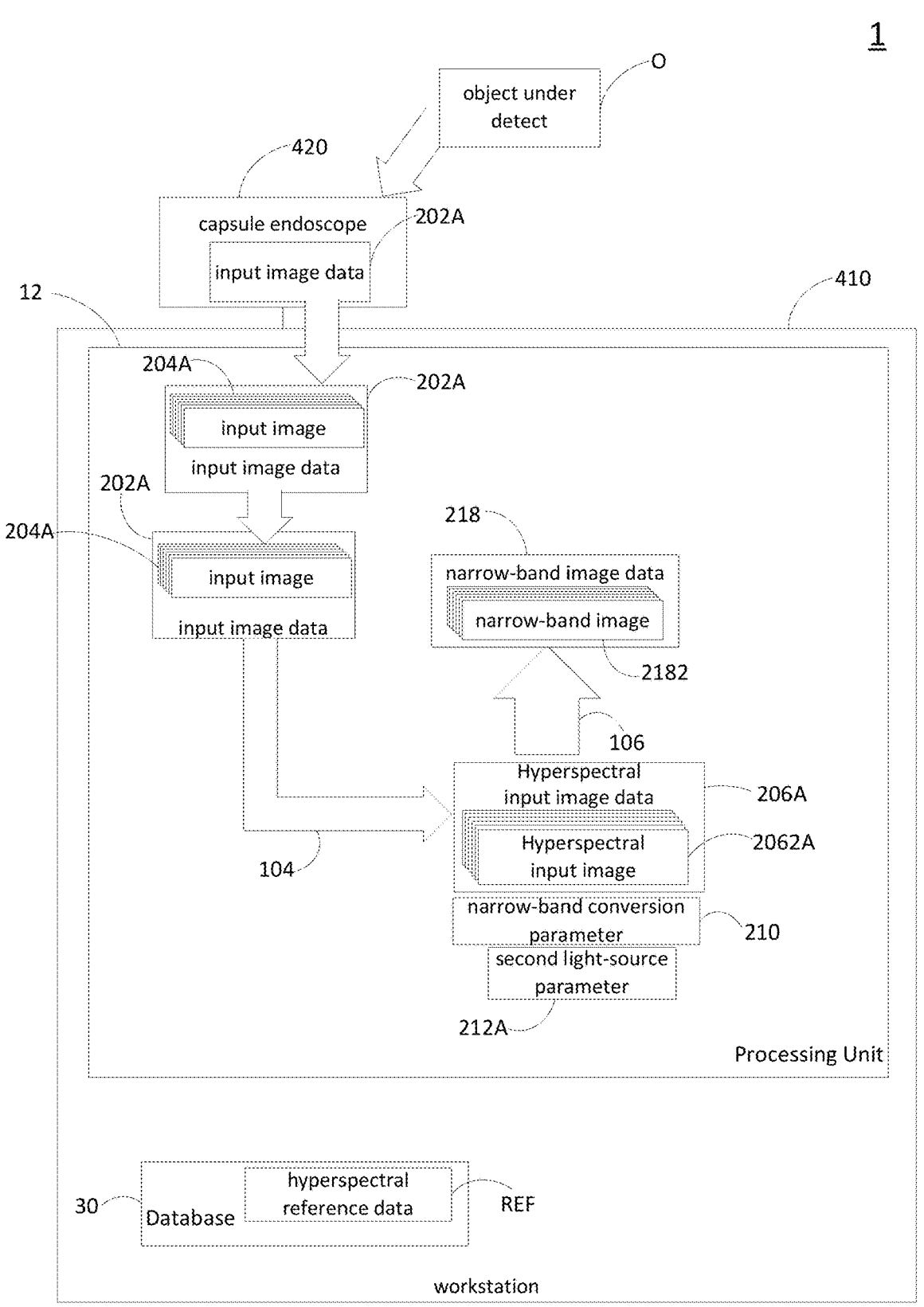
FIG. 8 shows a schematic diagram of acquiring the narrow band image according to the second embodiment of the present application.
Figure 9:
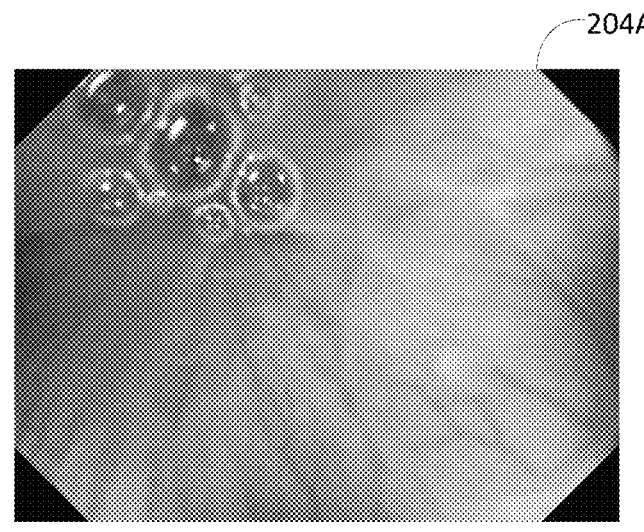
FIG. 9 shows a schematic diagram of the input image according to the present application.
Figure 10:
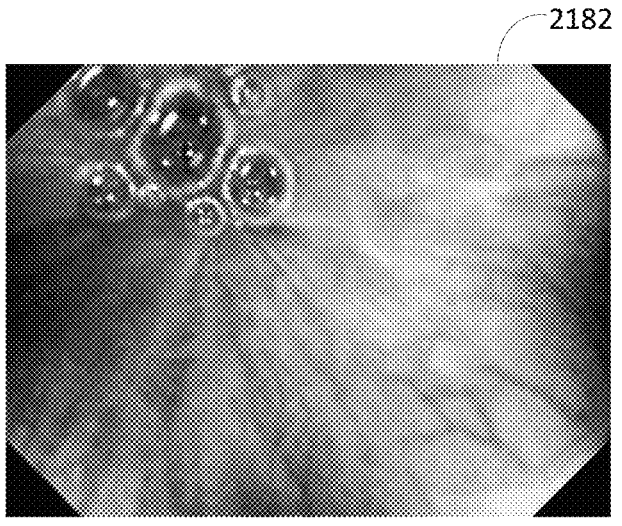
FIG. 10 shows a schematic diagram of the narrow band image according to the present application.

Next, as shown in FIG. 8, The capsule endoscope 420 acquires input image data 202A of an object under detect O, which includes a plurality of input images 204A, and provides them to the workstation 410. The processing unit 12 of the workstation 410 converts the input image data 202A to hyperspectral input image data 206, which include a plurality of hyperspectral input images 2062A, according to the hyperspectral reference REF. Then, the tricolor stimulus equation operation 106 is executed according to the hyperspectral input image data 206A, the narrow-band conversion parameter 210, and the second light-source parameter 212A to obtain narrow-band image data 218, which include a plurality of narrow-band images 2182, for improving the image identification of the input image data 202A and enhancing the clarity of the input image data 202A. As shown in FIG. 9 and FIG. 10, compared to the input image 204A, since the distribution of capillaries in the narrow-band image 2182 is more obvious, abnormal tissue proliferation can be more clearly identified and the distribution of capillaries is clearly presented.

To sum up, the present application discloses a method for converting endoscope images to narrow band images. First, acquire reference image data of a reference object using an endoscope and acquire a narrow-band image data of the reference object using a narrow-band endoscope. An operational device receives the reference image data and the narrow-band reference image data. Then the operational device executes data operations to obtain corresponding hyperspectral reference image data, narrow-band conversion parameter and first light-source parameter. Furthermore, generate narrow-band simulated image data according to the hyperspectral reference image data, the narrow-band conversion parameter and the first light-source parameter. Compare narrow-band simulated image data with the narrow-band reference image data initially acquired to obtain the corresponding chromatic aberration data. The operational device continues to execute data operations according to the chromatic aberration data and the second light-source parameter to obtain a second light-source parameter. The operational device receives the input image data, and then executes data operations on the input image data according to the narrow-band conversion parameter and the second light-source parameter to obtain a narrow band image of the object under detect. Thereby, the image identification and the clarity of the input image can be enhanced. Thereby, the distribution of capillaries is made more obvious; abnormal tissue proliferation can be more clearly identified; and the capillary distribution of tissues is clearly presented.

Accordingly, the present application conforms to the legal requirements owing to its novelty, non-obviousness, and utility. However, the foregoing description is only embodiments of the present application, not used to limit the scope and range of the present application. Those equivalent changes or modifications made according to the shape, structure, feature, or spirit described in the claims of the present application are included in the appended claims of the present application.

The invention claimed is:

1. A method for converting endoscope images to narrow band images, comprising:

acquiring a reference image data of a reference object by a first image capturing unit and acquiring a narrow-band reference image data of said reference object by a second image capturing unit, and transmitting said reference image data and said narrow-band reference image data to an operational device by said first image capturing unit and said second image capturing unit;

executing data operations according to said reference image data and said narrow-band reference image data to obtain hyperspectral reference image data, a narrow-band conversion parameter, and a first light-source parameter by said operational device;

generating narrow-band simulated image data according to said hyperspectral reference image data, said narrow-band reference image data, and said first light-source parameter by said operational device;

comparing said narrow-band reference image data and said narrow-band simulated image data to obtain chromatic aberration data by said operational device;

executing data operations according to said narrow-band simulated image data and said first light-source parameter to obtain a second light-source parameter by said operational device;

acquiring an input image data of an object under detect and transmitting said input image data to said operational device by said first image capturing unit; and generating narrow-band image data of said object under detect according to said input image data, said narrow-band conversion parameter, and said second light-source parameter by said operational device.

2. The method for converting endoscope images to narrow band images of claim 1, wherein said operational device converting said reference image data to said hyperspectral reference image data according to hyperspectral conversion parameters in said step of executing data operations according to said reference image data and said narrow-band reference image data to obtain hyperspectral reference image data, a narrow-band conversion parameter, and a first light-source parameter by said operational device.

3. The method for converting endoscope images to narrow band images of claim 1, wherein said operational device executes a tricolor stimulus equation operation on said hyperspectral reference image data according to said narrow-band conversion parameter and said first light-source parameter to obtain said narrow-band simulated data in said step of generating narrow-band simulated image data according to said hyperspectral reference image data, said narrow-band reference image data, and said first light-source parameter by said operational device; and said first light-source parameter is corresponding to a narrow-band parameter of said narrow-band simulated data.

4. The method for converting endoscope images to narrow band images of claim 1, wherein said operational device executes a tricolor stimulus equation operation on said input image data according to said narrow-band conversion parameter and said second light-source parameter to obtain said narrow-band image data in said step of said operational device generating narrow-band image data of said object under detect according to said input image data, said narrow-band conversion parameter, and said second light-source parameter; and said second light-source parameter is corresponding to a narrow-band parameter of said narrow-band image data.

5. The method for converting endoscope images to narrow band images of claim 1, wherein said second light-source parameter is corresponding to at least one second target band parameter, which is at least one of wavelengths 575 nanometers to 588 nanometers, 640 nanometers to 666 nanometers, and 705 nanometers to 744 nanometers, or the group consisting of wavelengths 445 nanometers to 458 nanometers, 575 nanometers to 588 nanometers, 640 nanometers to 666 nanometers, and 705 nanometers to 744 nanometers.

6. The method for converting endoscope images to narrow band images of claim 1, wherein said operational device executes a dual simulated annealing algorithm and obtain said second light-source parameter according to said chromatic aberration data and said first light-source parameter in said step of said operational device executing data operations according to said narrow-band simulated image data and said first light-source parameter to obtain second light-source parameter.

7. The method for converting endoscope images to narrow band images of claim 1, wherein said step of said operational device executing data operations according to said reference image data and said narrow-band reference image data to obtain hyperspectral reference image data, a narrow-band conversion parameter, and a first light-source parameter, comprises steps of:

acquiring a reference spectrum and a reflection reference spectrum according to said reference image data;

acquiring a narrow-band reference spectrum and a narrow-band reflection reference spectrum according to said narrow-band reference image data;

acquiring spectral reflectance space parameter from said reflection reference spectrum and said narrow-band reflection reference spectrum according to a reflection spectrum space transformation function;

acquiring said first light-source parameter from said reference spectrum and said narrow-band reflection reference spectrum according to a spectral space transformation function;

acquiring a calibration matrix according to said spectral reflectance space parameter and said first light-source parameter;

acquiring calibration space parameters and said hyperspectral reference image data according to said calibration matrix and said spectral reflectance space parameter; and acquiring said narrow-band conversion parameter according to said calibration space parameters, said reflection reference spectrum, and said narrow-band reflection reference spectrum.

8. The method for converting endoscope images to narrow band images of claim 7, wherein said operational device acquires the RGB images of each color of said reference object for analyzing and obtaining said corresponding reference spectrum and said corresponding reflection reference spectrum in said step of acquiring a reference spectrum and a reflection reference spectrum according to said reference image data.

9. The method for converting endoscope images to narrow band images of claim 1, wherein said operational device operates and compares first root-mean-square error data and second root-mean-square data of said narrow-band simulated image data and said narrow-band reference image data to obtain said chromatic aberration data in said step of said operational device comparing said narrow-band reference image data and said narrow-band simulated image data to obtain a chromatic aberration data.

\* \* \* \* \*